(12) United States Patent
Knox et al.

(10) Patent No.: US 7,867,951 B2
(45) Date of Patent: Jan. 11, 2011

(54) VISCOELASTIC CATIONIC CARBOHYDRATE ETHER COMPOSITIONS

(75) Inventors: Paul Wayne Knox, Kenosha, WI (US); Nicole Francis Perreault, Libertyville, IL (US)

(73) Assignee: Stepan Company, Northfield, IL (US)

( * ) Notice: Subject to any disclaimer, the term of this patent is extended or adjusted under 35 U.S.C. 154(b) by 652 days.

(21) Appl. No.: 11/599,927

(22) Filed: Nov. 14, 2006

(65) Prior Publication Data

US 2007/0111896 A1 May 17, 2007

Related U.S. Application Data

(60) Provisional application No. 60/736,562, filed on Nov. 14, 2005.

(51) Int. Cl.
*C09K 8/68* (2006.01)
*C09K 8/32* (2006.01)
*C09K 8/60* (2006.01)
*E21B 43/26* (2006.01)

(52) U.S. Cl. .................. 507/209; 507/129; 507/200; 507/240; 166/308.2

(58) Field of Classification Search .............. 166/308.2; 507/129, 200, 240, 209
See application file for complete search history.

(56) References Cited

U.S. PATENT DOCUMENTS

| | | | |
|---|---|---|---|
| 2,775,604 A * | 12/1956 | Zech | ........................... 554/109 |
| 3,039,873 A | 6/1962 | Beavers | |
| 3,168,416 A | 2/1965 | Zech | |
| 3,669,955 A * | 6/1972 | Hull | ............................. 536/50 |
| 3,884,977 A | 5/1975 | Molnar | |
| 4,663,159 A | 5/1987 | Brode, II et al. | |
| 4,734,277 A | 3/1988 | Login | |
| 5,258,137 A | 11/1993 | Bonekamp et al. | |
| 5,384,334 A * | 1/1995 | Polovsky et al. | ............ 514/777 |
| 5,387,675 A | 2/1995 | Yeh | |
| 5,551,516 A | 9/1996 | Normal et al. | |
| 5,964,295 A | 10/1999 | Brown et al. | |
| 5,979,557 A | 11/1999 | Card et al. | |
| 6,432,907 B1 * | 8/2002 | Skold et al. | ................. 510/470 |
| 2004/0067855 A1 | 4/2004 | Huges et al. | |
| 2004/0102330 A1 | 5/2004 | Zhou et al. | |
| 2006/0019836 A1 * | 1/2006 | Li et al. | ...................... 507/240 |

FOREIGN PATENT DOCUMENTS

| | | | |
|---|---|---|---|
| EP | 0702073 A1 | | 3/1996 |
| EP | 702073 A1 | * | 3/1996 |
| EP | 0835983 | | 12/2003 |
| GB | 2332224 A | | 6/2003 |
| WO | WO2006034101 A1 | | 3/2006 |

* cited by examiner

*Primary Examiner*—Timothy J. Kugel
*Assistant Examiner*—Aiqun Li
(74) *Attorney, Agent, or Firm*—McAndrews, Held & Malloy, Ltd.

(57) ABSTRACT

A viscoelastic composition containing an effective amount of at least one cationic carbohydrate ether having one or more cationic fragments and one or more carbohydrate fragments connected through one or more linker fragments for controlling the viscoelasticity of the composition, wherein at least some carbohydrate fragments are connected to the linker fragments through ether bonds. The viscoelastic composition of the present technology may be used to alter fluid rheology and impart both viscous and elastic properties to the treated fluids. Applications of the viscoelastic composition of the present technology include, but are not limited to, oil field fluids such as, for example, well bore treatment fluids.

45 Claims, 18 Drawing Sheets

Building Blocks

Carbohydrate Fragment

Linker Fragment

Cationic Fragment

C. Oligomeric Quat

A. Mono-Quat

B. Bis-Quat

VISCOELASTIC CATIONIC CARBOHYDRATE ETHER COMPOSITIONS

RELATED APPLICATIONS

This application claims priority to pending U.S. Provisional App. Ser. No. 60/736,562, filed Nov. 14, 2005. The content of U.S. Provisional App. Ser. No. 60/736,562 is hereby incorporated by reference in its entirety.

FIELD OF THE INVENTION

The presently described technology relates generally to quaternary ammonium compound derivatives of carbohydrates and the applications thereof. More specifically, the derivatives of carbohydrates of the presently described technology are cationic carbohydrate ethers comprising one or more cationic fragments with quaternary ammonium groups, one or more carbohydrate fragments, and one or more linker fragments, wherein at least some of the carbohydrate fragments are connected to linker fragments through ether groups. The cationic carbohydrate ethers of the present technology can also be referred to as carbohydrate quaternary ammonium compounds.

It has been found that one or more preferred cationic carbohydrate ethers of the present technology impart one or more distinctive and useful rheological properties to aqueous solutions at relatively low concentrations of active ingredients. The useful Theological properties provided by one or more preferred compositions of the present technology include, for example, viscoelasticity, increased viscosity, shear thinning, and drag reduction in moving fluids. The potential range of applications for the cationic carbohydrate ether compositions of the present technology is broad. Examples of applications include, but are not limited to, agricultural formulations, laundry additives, personal care formulations, industrial and institutional cleaners, scale removers and inhibitors, corrosion inhibitors, hydraulic fluids, demulsifiers, foamers, organoclays, thickeners, biocides, and oil field fluids. Particular focus of the presently described technology is directed at the abilities of the compositions of the present technology to alter solution rheology, for example to thicken, gel, or form viscoelastic solutions, especially under harsh conditions such as high temperature, high pressure, different pH ranges, etc.

BACKGROUND OF THE INVENTION

Some examples of bis-quaternary or polycationic quaternary ammonium compounds imparting useful rheological properties to aqueous solutions have been studied and reported. For example, U.S. Pat. No. 4,734,277, to Login, issued on Mar. 29, 1988, in general, describes the preparation of certain bis-quaternary compounds by reacting tertiary amines with a suitable epoxide, such as epichlorohydrin, and further describes that the resulting bis-quaternary ammonium compounds have utility as an additive in cosmetics applications, such as hair conditioners, skin lotions, etc.

Additionally, U.S. Pub. Pat. Appl. 2004/0067855, to Hughes, et al., published on Apr. 8, 2004, describes certain bis-quaternary or oligomeric cationic quaternary ammonium compounds useful in a viscoelastic wellbore treatment fluid for controlling the viscoelasticity of that fluid.

Hydrocarbons such as oil, natural gas, etc., are obtained from a subterranean geologic formation by drilling a well that penetrates the hydrocarbon-bearing formation. This drilling outcome provides a partial flow path for the hydrocarbon, typically oil, to reach the surface. In order for oil to travel from the formation to the wellbore (and ultimately to the surface), there must be a sufficiently unimpeded flow path through the rock formation (e.g., sandstone, carbonates), which generally occurs when rock pores of sufficient size and number are present.

A common impediment to oil production is "damage" to the formation, which plugs the rock pores and impedes the flow of oil. Moreover, depletion of zones nearest to the wellbore causes a gradual decline in production. Generally, techniques used to increase the permeability of the formation and to provide extended conduits to the wellbore are referred to as "stimulation." Aqueous gels are often used in different well stimulation processes.

For example, in a fracturing process, which is one kind of well stimulation technique, cracks or fissures (fractures) are created in subterranean formations. Gels are used in fracturing processes as the medium which transfers energy from outside the subterranean formation to the specific locations inside the subterranean formation in order to create the desired fractures. The energy to create the fractures is transferred primarily as pressure against the formation, by pumping the fracturing fluid into the wellbore where it is directed to desired portions of the subterranean formation. The gels are relatively incompressible fluids, and pressure is exerted against the subterranean formation until the force is sufficient to fracture the formation. Once the fracture is created, the high viscosity gel flows into the newly formed cracks and fissures. As the fracturing fluid flows into the fracture, it carries proppant (e.g., small particles of sand, ceramics, or other hard material) into the fracture. Once the force from pumping the fracturing fluid is removed, the proppant remains in the fractures, which prevents the fractures from closing. The fracturing fluid is then removed from the wellbore, and the wellbore is prepared for recovering further amounts of hydrocarbon(s).

Older technology utilizes polysaccharide polymers to form the aqueous gels utilized as fracturing fluids. Often, the polysaccharide gels are cross-linked using additives such as titanates, zirconates or borates. Once the fracturing process is complete, these gels normally require a separate process to remove them from the wellbore, which typically requires a significant amount of time and additional well treatment chemicals. Furthermore, complete removal of the polymer gel is seldom attainable, and the polymer that remains in the wellbore can clog the pores of the rock formation, thus preventing hydrocarbon from flowing through and from the pores.

Modified polysaccharides have been studied in different fields of applications. For example, U.S. Pat. No. 4,663,159, to Union Carbide Corporation, describes water soluble quaternary ammonium polysaccharides having from 50 to 20,000 repeat units and hydrophobic substitution. Allegedly, the cationic polysaccharides of U.S. Pat. No. 4,663,159 have enhanced viscosity, foaming and preferably improved surface properties, and possess utility in personal care, emulsions and cleansers.

For another example, U.S. Pat. No. 5,384,334, to Amerchol Corporation, describes alkoxylated alkyl glucosides having quaternary nitrogen-containing ether substituents, which allegedly possess cationics utility combined with extreme mildness to skin and hair, and are allegedly suitable for stable personal care compositions and processes.

U.S. Pat. No. 5,387,675, to Rhone-Poulenc Specialty Chemicals Co., relates to modified hydrophobic cationic thickening compositions, which allegedly have multiple uses as thickeners and are particularly suited for use in personal care products and in oil recovery. It describes water soluble quaternary alkyl ammonium ethers of polysaccharides or polyols (e.g. polyvinyl alcohol, polyethylene glycol, and glycerol) wherein the degree of substitution of the ethers is from about 0.001 to about 0.5.

One problem associated with at least some the modified cationic polysaccharides of the prior art is that the glycosidic hydroxyls or alkyl glycosides in these cationic polysaccharides are chemically labile groups, subject to hydrolysis. Hydrolysis rates are especially pronounced under aqueous conditions, with the rate of hydrolysis increasing as the pH decreases. Since many of the uses for viscoelastic compositions are in aqueous conditions, and some oil field applications are in harsh acidic aqueous conditions, glycosidic groups and the cationic polysaccharides of the prior art are not stable and thus disadvantageous.

Non-polymeric gellants (NPGs) are more recent technological developments that provide alternatives to polysaccharide gels. NPGs are surfactants, and usually are quaternary ammonium compounds (cationic) or amphoteric compounds. Particularly desired NPGs are viscoelastic surfactants (VESs) that can form viscoelastic solutions because certain properties of viscoelastic prove useful for well stimulation processes. One such property is the ability of a viscoelastic solution to transport proppant at lower viscosities than a polymer solution. Another useful property is the reduction of friction between the moving fluid and the surfaces contacted therewith. An especially useful feature of viscoelastic gels is that, on contact with hydrocarbons, the gels break with a resultant sharp drop in viscosity. At the lower viscosity, removal of the fracturing fluid from the wellbore requires no additional well treatment chemicals, and requires less time and equipment than do polymeric gellants. NPG surfactant gels may also be broken by other means. Furthermore, unlike polysaccharide gellants, there is much lower tendency of the NPGs to clog the hydrocarbon-producing pores in the subterranean formation.

NPGs are also useful in other well treatment applications. For example, they can reduce the loss of fracturing fluid into subterranean formations; reduce the production of water from wells; form gels for wellbore cleaning; and reduce friction in solutions.

The application of viscoelastic surfactants in both non-foamed and foamed fluids used for fracturing subterranean formations have been described in several patents, e.g. EP 0835983 B1, to Brown et al., issued Dec. 17, 2003; U.S. Pat. No. 5,258,137, to Bonekamp et al., issued on Nov. 2, 1993; U.S. Pat. No. 5,551,516, to Norman et al., issued on Sep. 3, 1996; U.S. Pat. No. 5,964,295, to Brown et al., issued on Oct. 12, 1999; and U.S. Pat. No. 5,979,557 to Card et al., issued on Jun. 16, 1999.

The use of viscoelastic surfactants for water shut off treatments and for selective acidizing is discussed in British Patent Application No. GB 2332224 A, to Jones et al., published on Jun. 16, 1999; and Chang F. F., Love T., Affeld C. J., Blevins J. B., Thomas R. L. and Fu D. K., "Case study of a novel acid diversion technique in carbonate reservoirs", Society of Petroleum Engineers, 56529, (1999).

More recent developments in this field can be found in U.S. Pub. Pat. App. No. 2004/0102330 A1, to Zhou, et al., published on May 27, 2004, which describes cleavable monomeric viscoelastic surfactants; and U.S. Pub. Pat. App. No. 2004/0067855 A1, to Hughes, et al., published on Apr. 8, 2004, which describes oligomeric anionic or cationic viscoelastic surfactants (including dimeric and trimeric forms).

Conventional cationic NPGs used in the hydrocarbon recovery field utilize alkyl amines with a single hydrophobic carbon chain. To be useful in fracturing applications, the hydrophobe chains of conventional cationic NPGs are preferably and predominantly 18 carbon atoms in length, and more preferably greater than 18. An example of one such commercially available material is ClearFRAC™, commercially available from Schlumberger-Doll Research ("Schlumberger," Ridgefield, Conn.), i.e., erucyl-N,N-di-(2-hydroxyethyl)-N-methylammonium chloride (EHMAC), which is asserted to provide performance at the highest application temperatures (up to about 250° F. (about 121° C.)) of any currently commercially available viscoelastic fracturing fluid. This product reportedly contains less than 3% hydrophobe carbon chains of 18 carbons or less. Because the intermediate used to make EHMAC must be purified to remove the components with alkyl chains of 18 carbons or less, EHMAC costs substantially more to produce than other alkyl amine cationic materials. The high cost of EHMAC limits the number of stimulation processes for which it is used on a repeated basis.

A commercially available alternative to ClearFRAC™ is AquaClear™ surfactant fracturing fluid, commercially available from BJ Services Company ("BJ Services", Houston, Tex.). It also uses a quaternary alkylamine, but is less costly because an extensively purified intermediate is not required. However, the maximum application temperature for Aqua-Clear™ is about 170° F. (about 76.7° C.), which is substantially lower than ClearFRAC™'s 250° F. (about 121° C.).

While having some obvious advantages over polysaccharide gels, conventional NPG gels also have some disadvantages. One is the temperature limitation of conventional NPG surfactant gels. As well depth increases, wellbore hole temperature usually also increases, and may frequently exceed 250° F. (about 121° C.). Currently, conventional NPG surfactant technology fails under these conditions, while polysaccharide gels continue to perform. Another disadvantage is cost, in that the material cost for polysaccharide gels is substantially lower than that for NPG surfactant gels.

Yet another disadvantage of conventional NPG surfactants is their toxicity to the environment and their poor biodegradability. Because cationic alkylamines do not breakdown readily in the environment, they tend to accumulate. Alkylamine quaternary compounds are also toxic to many life forms, so they can have a destructive impact particularly on environments in which they accumulate. Some areas of the world have imposed regulatory restrictions on chemicals based on their being hazardous to the environment. For example, in the North Sea, chemicals such as cationic alkylamine are either restricted or banned entirely.

Still another disadvantage of conventional NPG surfactants is their poor solubility, poor salt stability, and/or poor acid solubility in highly concentrated salt solutions, such as those high density brines used in wellbore service fluids.

Thus, there is a need for gellants, in particular, viscoelastic gellants, that can provide all or most of the advantages of the conventional NPG technology, and that (1) can provide viscoelastic properties at higher temperatures (greater than 80° C. or 176° F., and preferably greater than 110° C. or 230° F.); (2) are more eco-friendly; (3) are more cost effective; (4) have increased solubility in highly concentrated salt solutions; and/or (5) can provide improved salt stability and/or acid solubility. The presently described technology addresses these needs.

BRIEF SUMMARY OF THE INVENTION

It has been surprisingly found that one or more cationic carbohydrate ethers (CCEs) of the presently described technology that have one or more cationic fragments and one or more carbohydrate fragments connected through one or more linker fragments can be used as active ingredients to form viscoelastic compositions with distinctive and useful properties. Preferably, each of the cationic fragments contains at least one quaternary ammonium group providing at least one cationic site. Additionally, it is also preferred that at least some of the carbohydrate fragments are connected to the linker fragments through ether bonds. Moreover, it is also preferable that at least one of the cationic fragments in the cationic carbohydrate ether of the presently described technology comprises at least one hydrophobe. The carbohydrate fragments in the cationic carbohydrate ethers of the present technology are derived from carbohydrates, and, preferably, are derived from sugars, reduced sugars, or derivatives thereof.

In one aspect, the presently described technology provides a viscoelastic composition comprising water and at least one cationic carbohydrate ether to control the viscoelasticity of the composition, wherein the at least one cationic carbohydrate ether comprises one or more cationic fragments, one or more carbohydrate fragments, and one or more linker fragments, wherein at least some of the carbohydrate fragments are connected to the linker fragments through ether groups. Preferably, each of the linker fragments can be hydrocarbyl groups having from about 2 to about 30 carbon atoms, or substituted hydrocarbyl groups having from about 2 to about 30 carbon atoms. Preferably, at least one of the cationic fragments comprises at least one hydrophobe. Each of the hydrophobes can comprise, for example, a hydrocarbyl group having from about 13 to about 40 carbon atoms or a substituted hydrocarbyl group having from about 13 to about 40 carbon atoms. Preferably, each of the carbohydrate fragments contains three or more hydroxyl groups, alkoxylated hydroxyl groups, alkylated hydroxyl groups, or a combination thereof. Examples of carbohydrate compounds appropriate for incorporation into the cationic carbohydrate esters of the presently described technology include, but are not limited to, sugars (e.g., fructose, glucose, lactose, mannose, sucrose, et cetera), reduced sugars (e.g., mannitol, sorbitol, glycerols, etc.), or derivatives thereof.

The negative counter ion(s) of the one or more cationic sites in the cationic carbohydrate ether of the presently described technology can be negatively charged inorganic ions, negatively charged functional groups of organic molecules, and/or negatively charged functional groups which are part of the cationic carbohydrate ether.

Compared with conventional viscoelastic surfactants, one advantage of at least some embodiments of the cationic carbohydrate ethers (CCEs) of the presently described technology is that such CCEs can be produced with a substantially lower cost, and utilize commodities or raw materials that are readily available. For example, in at least some embodiments, the one or more hydrophobe blocks in the CCE of the present technology can be derived from a carboxylic acid derived from a common commodity animal or vegetable oil source, while the carbohydrate groups can be derived from, for example, common commodity sugars such as sucrose or fructose.

Compared with conventional viscoelastic surfactants, another advantage of at least some embodiments of the cationic carbohydrate ethers of the presently described technology is that such compositions exhibit increased solubility in highly concentrated salt solutions, including high density brines used in wellbore service fluids. For example, in at least some embodiments, a high density brine containing as high as about 20% or more, alternatively about 50% or more, alternatively about 70% or more, by weight of salt(s) can be made into a clear viscoelastic gel or a clear thickened solution with cationic carbohydrate ethers of the presently described technology. For another example, in at least some embodiments, a viscoelastic solution made from the cationic carbohydrate ethers of the presently described technology and containing about 7% by weight or more of potassium chloride (KCl) does not precipitate above the temperature at which the solution is no longer viscoelastic.

Some viscoelastic solutions of cationic carbohydrate ethers of the presently described technology are believed to also impart an improved salt stability and/or acid solubility to other, secondary cationic viscoelastic surfactants. For example, combinations of some embodiments of the presently described cationic carbohydrate ethers with either bis-quaternary ammonium compounds or mono-quaternary ammonium quaternary compounds (e.g., erucyl-N,N-di-(2-hydroxyethyl)-N-methylammonium chloride) can be made into clear viscoelastic solutions at higher potassium chloride concentrations than can be used with either of the secondary surfactants alone. A formulation comprising a combination of at least one CCE composition with at least one secondary cationic viscoelastic surfactant is one of the preferred embodiments of the presently described technology. The ratio of the CCE composition to the secondary cationic viscoelastic surfactant in such combination formulations can be varied, for example, to effect control over relationships between viscosity, temperature, and shear rate across an expanded range of salt concentrations.

Compared with conventional viscoelastic surfactants, one or more preferred cationic carbohydrate ethers of the present technology also exhibit higher viscosities at higher temperatures and higher salt concentrations. Preferably, the viscoelasticity of a CCE composition of the present technology can be maintained at a temperature greater than about 80° C., more preferably at a temperature greater than about 100° C., most preferably at a temperature greater than about 110° C. Therefore, the useful working temperatures of wellbore treatment fluids based on the present technology, for example, can be increased.

Further, another notable advantage in one or more preferred embodiments of the present technology is the ease of degradation of cationic carbohydrate ethers (CCEs) after their use or disposal. At least some cationic carbohydrate ethers of the present technology are more susceptible than conventional alkylamine cationic compounds to natural chemical degradation processes such as hydrolysis or oxidation. As a result, one or more of the CCE compositions of the present technology can degrade in the environment faster than conventional alkylamine cationic compounds. The carbohydrate-ether grouping offers multiple pathways for oxidative degradation and imposes less oxygen demand for degradation than do, for example, hydrocarbon groups, which are at a lower initial level of oxidation than carbohydrate groups. In instances when the CCEs of the present technology comprise a hydrophobic group with substantial hydrocarbon character, preference is given to groups derived from naturally occurring fatty acids or their derivatives, especially ester amines or amidoamines.

Relative to, for example, alkylamines, fatty amidoamines or fatty ester amines are more readily degraded because they can undergo hydrolytic cleavage of the amine group from the hydrocarbon hydrophobe. Therefore, some embodiments of the chemical compounds of the present technology are expected to be less environmentally harmful and accumulate less in the environment than conventional alkylamine cationic compounds.

The amount of cationic carbohydrate ethers (CCEs) of the present technology in a viscoelastic composition should be sufficient to provide the viscoelasticity needed for the desired composition and application. For example, in some embodiments, the amount of CCEs, preferably the amount of all quaternary ammonium compounds is less than about 15%, alternatively from about 0.1% to about 3%, alternatively from about 3% to about 4%, by weight based on the total weight of the viscoelastic composition. Current commercial systems tend to use 3 wt % to 4 wt % conventional cationic viscoelastic surfactants, and certain preferred embodiments of the present technology thus offer the advantage of requiring lower quantities of cationic viscoelastic surfactants to achieve comparable or noticeably higher composition viscosities.

Certain viscoelastic compositions of the present technology can be used in, for example, wellbore treatment fluids, drilling fluids, thickeners, completion fluids, diversion fluids, and many other applications where thickened or gelled aqueous compositions are desired. An example of applications of certain cationic carbohydrate ethers of the preset technology is as a gellant in hydraulic fracturing fluids used in hydrocarbon recovery stimulation processes. In this application, the ability of the fluid to transport proppant (solid particulates) is an essential feature related to the rheology properties imparted to the fluid by the gellant.

Another hydrocarbon recovery stimulation process for which certain cationic carbohydrate ether (CCE) compositions of the present technology are suitable is acidizing—essentially the process of dissolving portions of a subterranean formation to provide hydrocarbon producing portions of the formation increased or improved access to the wellbore. Such CCE compositions of the present technology can thicken acid solutions and also reduce the rate of acid fluid loss into the subterranean formation to increase the efficiency of the acidizing process. In some acidizing embodiments of the present technology utilizing a composition comprising a CCE of the present technology, the CCE can perform multiple functions, serving not only to thicken the acid, but also to prevent corrosion of steel pipes and tubing used in a wellbore.

Yet another wellbore service fluid application for which certain compositions comprising a CCE of the present technology are suitable is in clear brine completion fluids. Clear brine completion fluids are used in the process of transitioning a wellbore from a drilling, rework or stimulation process. The ability of CCEs to thicken or gel the special brines used in these processes can confer advantages such as improved efficiency, reduced fluid loss and increased recovery of costly and sometimes toxic metal salts. Compared to polysaccharide thickeners, such as guar or hydroxypropyl guar, CCEs of the present technology are expected to exhibit properties similar to those of other cationic surfactant viscoelastic gellants, such as ease of removal from the wellbore and reduced formation damage.

Compositions comprising certain CCEs of the present technology can be used as thickeners in non-oilfield applications, including, but not limited to, laundry (fabric softener), personal care (hair conditioners, scrubs, or skin care), or industrial cleaners. For example, at least one composition comprising a CCE of the present technology can be used as a scale remover, where the CCE can form a gel that resists flowing when applied to a vertical surface and increases the efficiency of dissolution of calcium and magnesium salts typically found in scales.

Other CCE compositions of the present technology can be used for applications where large amounts or long-lasting foams are desirable. Again, personal care and industrial cleaner applications are examples where CCEs of the present technology can confer advantages.

DETAILED DESCRIPTION OF THE INVENTION

Abbreviations, Definitions and Conventions

Figure 1:
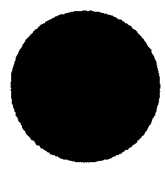
FIG. 1 is a schematic representation of a mono-cationic carbohydrate ether ("mono-quat"), a bis-cationic carbohydrate ether ("bis-quat"), and an oligomeric cationic carbohydrate ether ("oligomeric quat") having three cationic fragments in accordance with some embodiments of the present technology. The two or more cationic fragments or the two or more carbohydrate fragments in the bis-quat or oligomer quat are either the same or different.
Figure 1:
Figure 1:
Figure 1:
Figure 1:
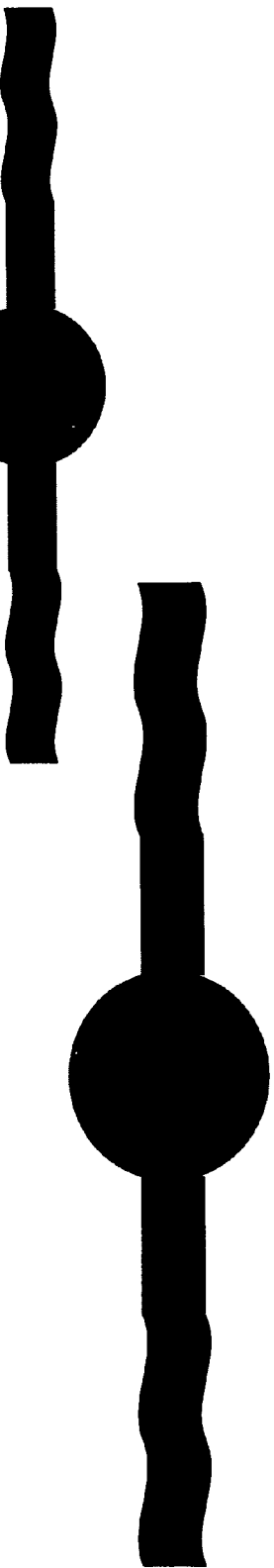
Figure 1:
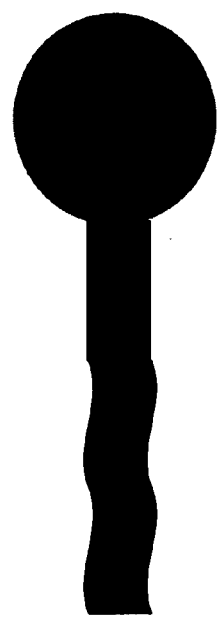

As used herein, the term "carbohydrate" refers to monosaccharides and oligosaccharides as well as substances derived from monosaccharides by reduction of the carbonyl group (alditols), by oxidation of one or more terminal groups to carboxylic acids, or by replacement of one or more hydroxy group(s) by a hydrogen atom, an amino group, a thiol group or similar heteroatomic groups. It also includes derivatives of these compounds. As the term "carbohydrate" is used herein, it does not include starch, cellulose and guar, or other polysaccharides with high weight average molecular weights. As defined by the present application, "high weight average molecular weights" are those exceeding about 3000 Daltons. Examples of carbohydrates as defined by the present application include, but are not limited to, sugars, reduced sugars, derivatives thereof, and combinations thereof.

As used herein, the term "saccharide" refers to chemical compounds with the formula $(CH_2O)_n$. that contain either an aldehyde or ketone group (or their derivatives, such as acetal, hemiacetal, ketal or hemiketal).

As used herein, the term "polysaccharide" refers to polymeric chains of saccharides joined by glycosidic bonds with weight average molecular weight greater than about 3000 Daltons.

As used herein, the term "oligosaccharide" refers chains of 2 or more saccharides joined by glycosidic bonds with weight average molecular weight less than about 3000 Daltons.

As used herein, the term "sugar" refers to monosaccharides, disaccharides and other lower oligosaccharides. Saccharides in sugars are joined by glycosidic links. Sugars may also be defined as polyhydroxy aldehydes or ketones with three or more carbon atoms. The simplest sugars are thus glyceraldehyde and dihydroxy acetone.

As used herein, the term "reduced sugar" refers to a carbohydrate in which the aldehyde or ketone is formally reduced, typically to an additional alcoholic hydroxyl group. For example, glycerol is the reduced sugar of glyceraldehyde and dihydroxy acetone, and sorbitol is a reduced sugar from glucose. Reduced sugars are also called "sugar alcohols."

As used herein, the term "glycoside" refers to mixed acetals or ketals formally arising by elimination of water between the hemiacetal or hemiketal hydroxy group of a sugar and a hydroxy group of a second compound. The bond between the two components is called a glycosidic bond. As used herein, glycosidic bonds are not ether bonds, and a glycosidic group does not comprise an ether group.

As used herein, the term "alkylglycoside" refers to a glycoside in which the second group above is an alcohol with an alkyl group of from 1 to about 30 carbon atoms.

As used herein, the term "glycan" refers to a saccharide homopolymer, or polysaccharide, with glycosidic sugar linkages forming the polymer chain. Glycans are named by replacing the "-ose" ending of the monomeric saccharide with the "-an" ending. For example, a glucose polysaccharide is a glucan. Additional information can be added to the name to provide more detail, such as sugar configuration, e.g. alpha or beta, and notation for the glycosidic linkages.

As used herein, the term "starch" refers to a mixture of two naturally occurring α-glucose homopolymers, amylase and amylopectin. Amylose is α-1,4-glucan. Amylopectin is a modified form of amylase in which the polysaccharide chain is branched about every 24 to 30 glucose monomer units by an α-1,6 link. The general formula for a typical starch is $(C_6H_{10}O_5)_n$.

As used herein, the term "cellulose" refers to β-1,4-glucan, a β-glucose homopolymer with 1,4 glycosidic links, and has the general formula $(C_6H_{10}O_5)_n$.

As used herein, the term "APDMA" refers to an amidopropyldimethyl amine derivative of 3-N,N-dimethylaminopropyl amine and a carboxylic acid.

As used herein, the term "DMAPA" refers to 3-N,N-dimethylaminopropyl amine.

As used herein, the term "HERAPDMA" refers to high erucic APDMA derived from rapeseed oil selected from varieties known to produce fatty acids with 40% or more (wt %) erucic acid, a 22 carbon atom fatty acid with one carbon-carbon double bond.

As used herein, the term "BAPDMA" refers to behenyl APDMA, derived from a fatty acid composition with predominantly saturated 22 carbon atom fatty acids with no carbon-carbon double bonds.

As used herein, the term "SoyAPDMA" refers to APDMA derived from soya oil.

As used herein, the term "SAPDMA" refers to APDMA derived from a fatty acid composition with predominantly saturated 18 carbon atom fatty acids with no carbon-carbon double bonds.

As used herein, the term "C-65APDMA" refers to APDMA derived from fractionated soya fatty acids comprising about 44% palmitic and about 56% oleic fatty acid chains.

As used herein, the term "HERBAPP" refers to high erucic bis-aminopropylpiperazine, with a general structure shown below.

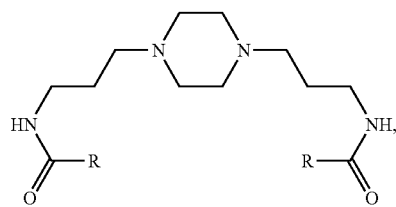

wherein, R represents aliphatic hydrocarbyl chains found in naturally occurring high erucic rapeseed oil derived fatty acids. HERBAPP has been found to be resistant to quaternization by epichlorohydrin and halohydrins. Without being bound by any particular theory, this resistance is thought to result from the tertiary amine nitrogen atoms being part of the piperazine ring, which makes the effective nucleophilicity of the amines much lower than that of the dimethylamine groups in the APDMAs.

As used herein, the term "aliphatic" refers to compounds of carbon that are not aromatic. Aliphatic compounds include cyclic compounds and acyclic compounds. Aliphatic compounds can include elements other than carbon and hydrogen, for example, boron, nitrogen, oxygen, fluorine, silicon, phosphorus, sulfur, chlorine, selenium, bromine, tellurium, or iodine.

As used herein, the term "aromatic" refers to unsaturated compounds with at least one closed ring of at least 5 atoms, with all of the ring atoms co-planar or almost co-planar and covalently linked, and with all of the ring atoms part of a mesomeric system. As used herein, when the "aromatic" substituent is monocyclic, it preferably contains 5 or 6 ring atoms, and when the "aromatic" substituent is polycyclic, it preferably contains 9 or 10 ring atoms contained in fused rings.

As used herein, the term "hydrocarbyl" refers to a group or compound composed of carbon and hydrogen only, i.e., a hydrocarbon.

As used herein, the term "hydrophobe" refers to hydrophobic segments of atoms in molecules that include a straight or branched hydrocarbon chain of five or more carbon atoms.

As used herein, the term "polycationic" pertains to molecules that have two or more atoms which have a positive electrical charge, preferably at all pH's.

As used herein the term "Gemini quaternary ammonium compound" or "GQ" refers to a bis-quaternary ammonium compound, where each of the two cationic fragments in the molecule comprises at least one hydrophobe.

As used herein, a "viscoelastic" composition (e.g., solution, fluid, or gel) is one that exhibits "bubble recoil." The "bubble recoil test," known to those skilled in the art, is described in, for example, U.S. Pat. No. 6,258,859 to Rhodia, Inc., issued on Jul. 10, 2001, which provides in col. 2, lines 55-60, "one test which has been found to be useful in determining the viscoelasticity of an aqueous solution consists of swirling the solution and visually observing whether the bubbles created by the swirling recoil after the swirling is stopped. Any recoil of the bubbles indicates viscoelasticity." The relevant disclosures in U.S. Pat. No. 6,258,859 are expressly incorporated herein by reference. Another useful test is to measure the elastic (or storage) modulus (G') and the loss modulus (G") at a given temperature. If the elastic (or storage) modulus G' of a composition is equal to or greater than the loss modulus G" as measured using an oscillatory shear rheometer (such as a Bohlin CVO 50 or TA Instruments AR2000) at at least one frequency between 0.0001 Hz and 1 Hz at a given temperature, for example, at 20° C., the composition is typically considered viscoelastic at that given temperature. The measurement of these moduli is described in An Introduction to Rheology, by H. A. Barnes, J. F. Hutton, and K. Walters, Elsevier, Amsterdam (1997), which is incorporated herein by reference.

Once a composition has been determined to be viscoelastic (e.g., either through the bubble recoil or moduli criteria test), the performance criteria of the composition relating to the ability to transport proppant, for example, is a minimum viscosity of 0.1 Pa·s at a shear rate of 100 sec$^{-1}$. A person killed in the art will understand that the viscosity of 0.1 Pa·s at a shear rate of 100 sec$^{-1}$ is a threshold for a composition to transport proppant. The temperature at which the viscosity of a composition drops below this threshold point is the maximum allowable working temperature for the composition if it is used to transport proppant, since below that point the composition can no longer efficiently transport proppant. More discussion about this threshold viscosity point can be found in Example 13.

Further, a thickened solution that is not viscoelastic can be distinguished from a viscoelastic solution. Viscosity can be divided into two components, an elastic component (related to the storage modulus, G') and a viscous component (related to the loss modulus, G"). In somewhat simplified terms, the viscous component represents the Newtonian response to shear stress behavior of a solution, while the elastic component represents the tendency of the solution to behave as an elastic solid in response to shear stress. To some extent, viscoelastic solutions are a subset of thickened solutions. For a viscoelastic solution, the contribution from the elastic component to the shear stress response is substantial. In a "thickened solution" or "viscous solution" that is not "viscoelastic," the shear stress response is primarily a function of the viscous component, and the contribution from the elastic component is relatively insubstantial. Generally, the two types of solutions with increased viscosity can be easily distinguished by the "bubble recoil test." Viscoelastic solutions exhibit bubble recoil, but non-viscoelastic "thickened solutions" do not. In general, a viscoelastic solution can transport proppant at a lower solution viscosity than a "viscous solution" that is not viscoelastic.

DESCRIPTION OF THE INVENTION

While the presently described technology is described herein in connection with one or more preferred embodiments, it should be understood that it is not limited to those embodiments. On the contrary, the presently described technology includes all alternatives, modifications, and equivalents to those embodiments as may be included within the spirit and scope of the appended claims.

The presently described technology relates generally to the preparation, compositions, and uses of carbohydrates etherified at one or more of the non-glycosidic hydroxyl groups and linked to quaternary ammonium groups. Glycosidic hydroxyls and alkyl glycosides are chemically labile groups, subject to hydrolysis. Hydrolysis rates are especially pronounced under aqueous conditions, with the rate of hydrolysis increasing as the pH decreases. Since many of the uses for cationic carbohydrate ethers (CCEs) of the presently described technology are in aqueous conditions, and some preferred applications are in harsh acidic aqueous conditions, glycosidic groups are not stable and thus disadvantageous. Carbohydrate ethers as described herein comprise ethers, which can be aliphatic, aromatic, or combinations of thereof, formed between alcoholic carbohydrate hydroxyls and carbon atoms on linker substrates. At least a portion of the linker substrates are also connected to quaternary ammonium groups, which preferably are cationic at all aqueous pHs.

In one aspect, the presently described technology relates to viscoelastic compositions containing cationic carbohydrate ethers that have one or more cationic fragments and one or more carbohydrate fragments connected through one or more linker fragments, wherein at least some of the carbohydrate fragments are connected to the linker fragments through ether groups. Preferred linker fragments are carbohydrate derivatives when the linker is hydrophilic. The cationic sites in the cationic fragments of the cationic carbohydrate ethers of the present technology are quaternary ammonium chemical functional groups. Preferably, at least some of the linker fragments are connected to the cationic fragments on the cationic sites though C—N bonds formed by substitution reactions. In accordance with some embodiments of the presently described technology, the cationic carbohydrate ether molecule comprises one or more hydrophobes. Preferably, at least one of the cationic fragments of the cationic carbohydrate ether of the present technology comprises one or more hydrophobes. The molecules of the cationic carbohydrate ethers may also have other chemical functional groups.

The molecules of the cationic carbohydrate ether may be mono-cationic or polycationic such as bis-quats or oligomeric quats. For example, FIG. 1 shows a schematic representation of a mono-quat (compound A), a bis-quat (compound B), and an oligomeric quat having three cationic fragments in accordance with some embodiments of the present technology (compound C). As shown in FIG. 1, in accordance with some embodiments of the presently described technology, each cationic fragment is connected to a carbohydrate fragment by a linker fragment. The linkage between the carbohydrate fragment and the linker fragment is an ether group. If there are two or more carbohydrate fragments in the molecule as shown in compound C of FIG. 1, one carbohydrate fragment can be connected to the other through a linker fragment as well.

The negative counter ion(s) of the one or more cationic sites in the cationic carbohydrate ether of the presently described technology can be negatively charged inorganic ions, negatively charged functional groups of organic molecules, and/or negatively charged functional groups which are part of the cationic carbohydrate ether. They can be from any source or in any combination as known to those skilled in the art.

Figure 2:
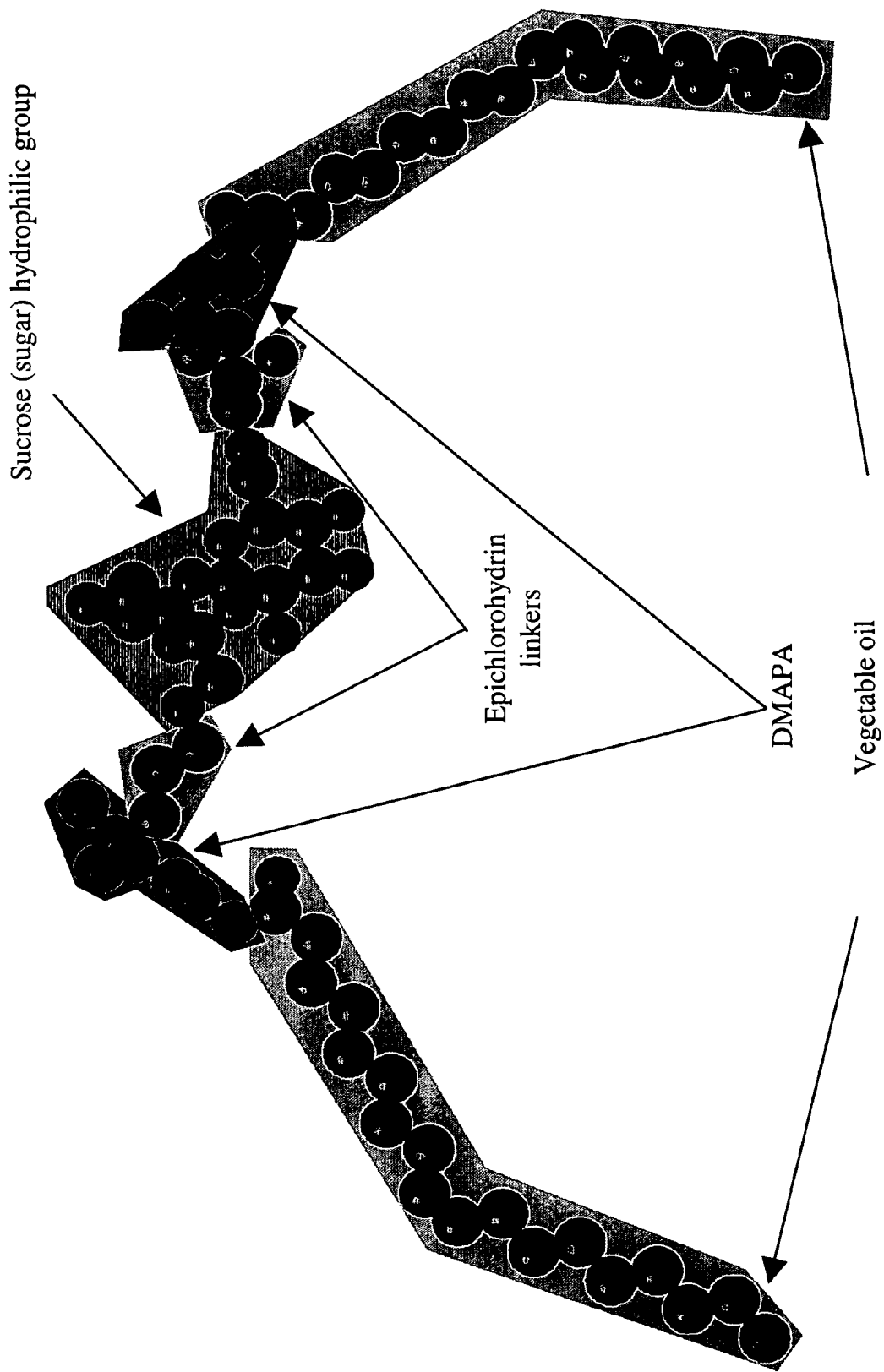
FIG. 2 is a schematic representation of an exemplary bis-quat of the presently described technology, wherein an amidoamine derived from dimethylaminopropylamine (DMAPA) and a vegetable oil provides the cationic fragments, epichlorohydrin provides the linker fragments, and sucrose provides the carbohydrate fragment.
Figure 3:
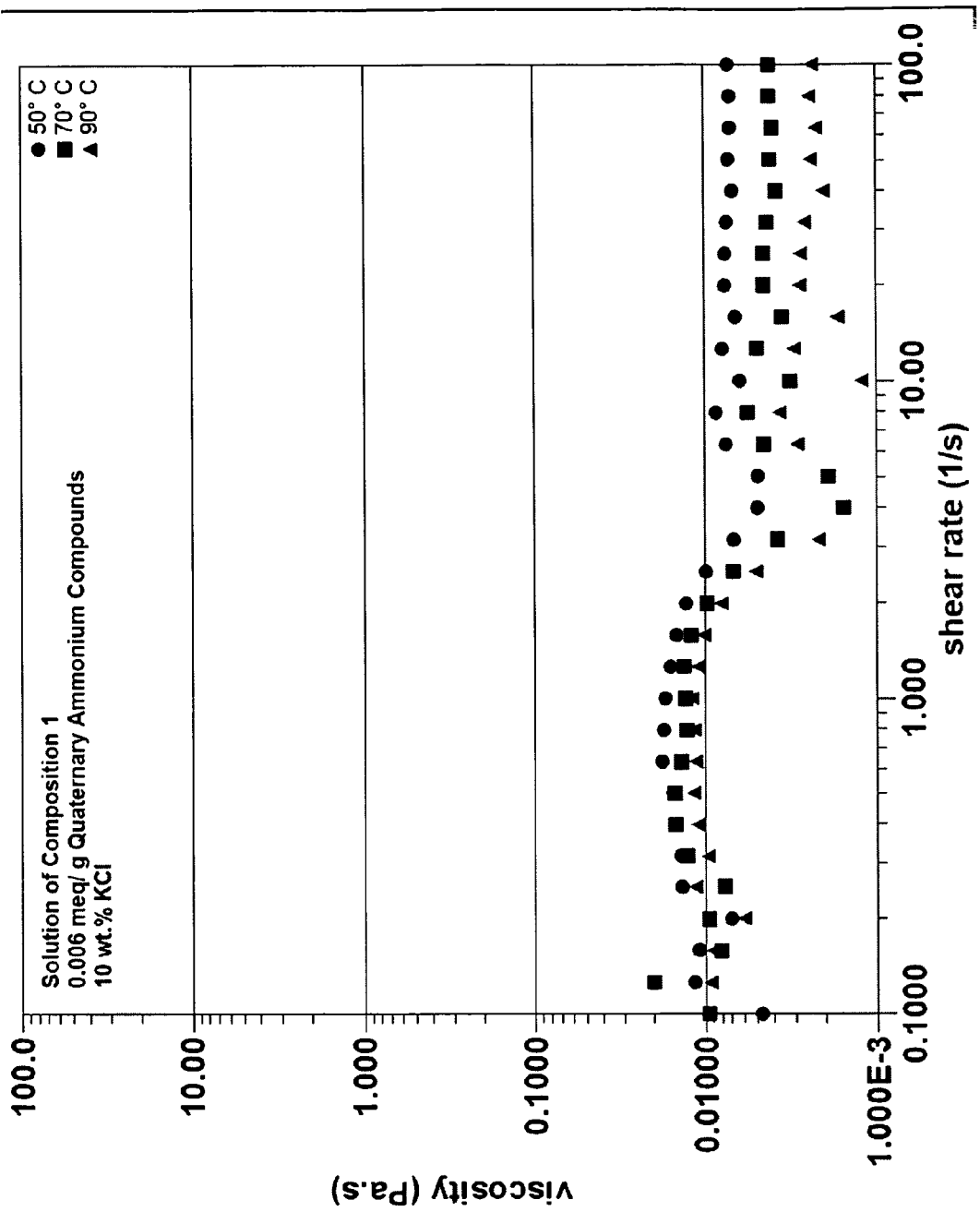
FIGS. 3-15 show graphs for stepped shear experiments for CCE solutions made from CCE compositions prepared in Examples 1, 3, 4, 7, and 12. The experiments were conducted at three temperatures—50° C., 70° C. and 90° C.
Figure 4:
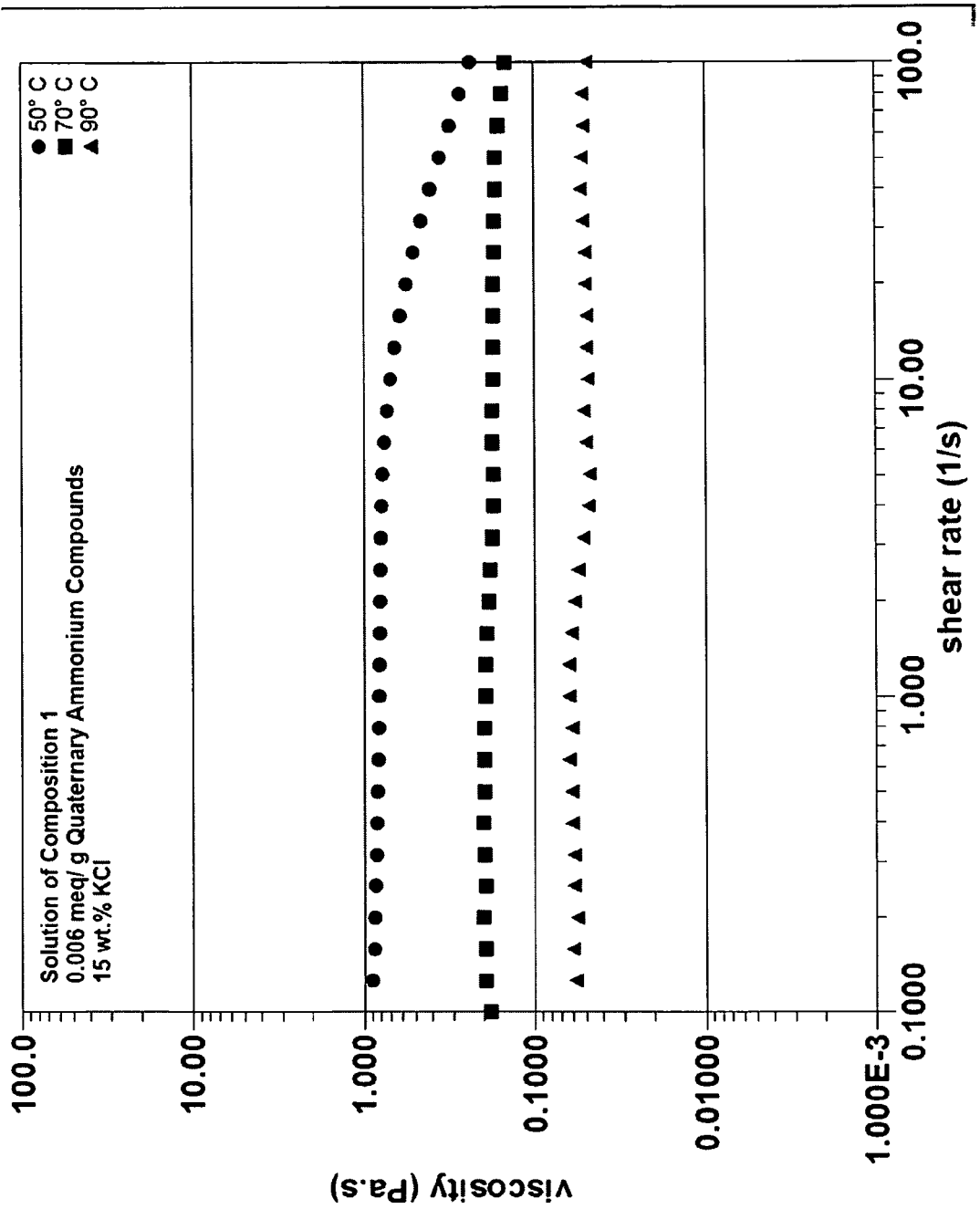
Figure 5:
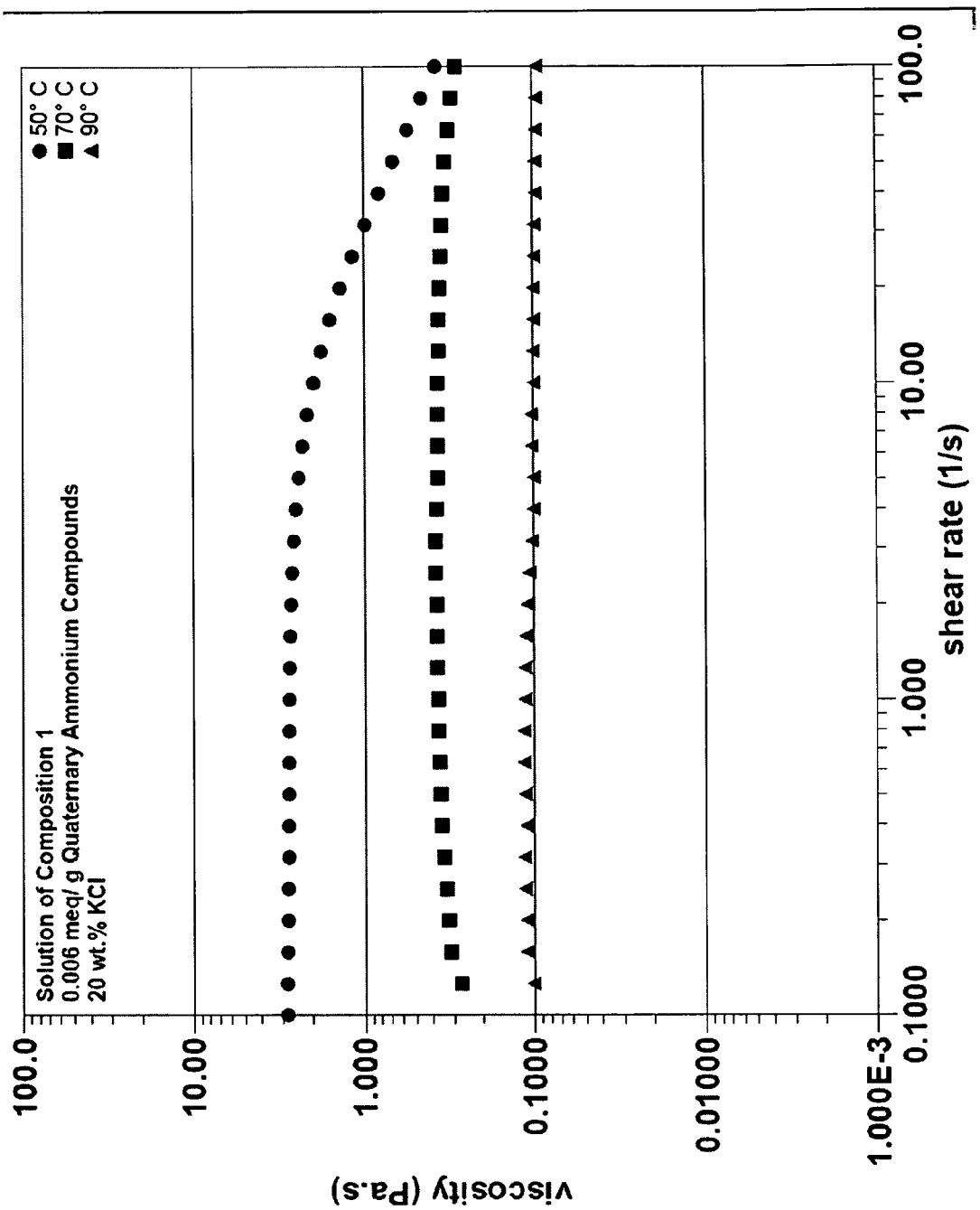
Figure 6:
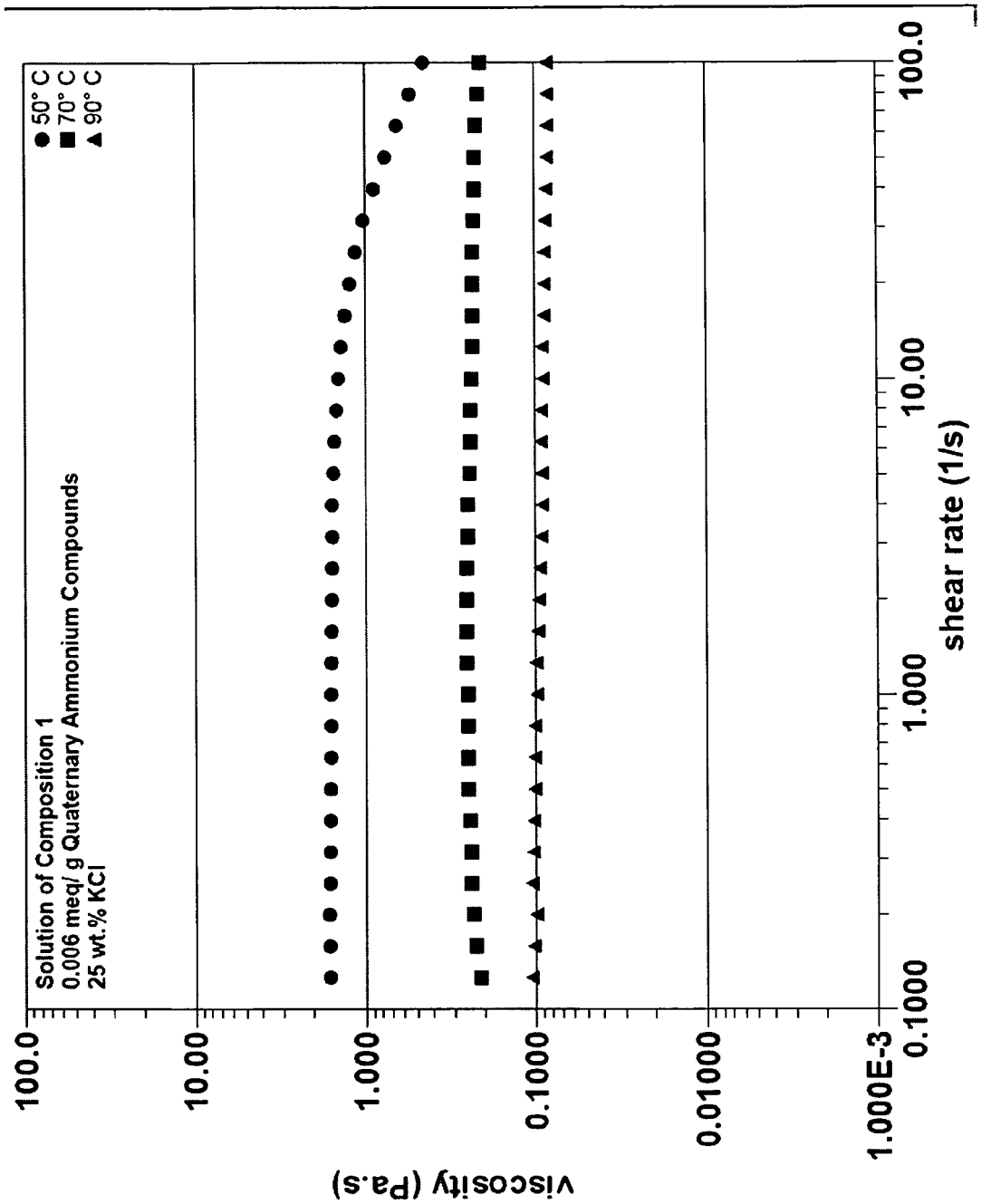

When the cationic carbohydrate ether is polycationic, the two or more cationic fragments, the two or more carbohydrate fragments, and the two or more linker fragments in the molecule can be the same or different, and can be joined in different orders. For example, in accordance with some embodiments of the present technology, the molecules of the bis-quaternary ammonium carbohydrate ethers of the present technology may be symmetric; in some other embodiments of the present technology, they may be dissymmetric. FIG. 2 shows a schematic representation of an exemplary symmetric bis-cationic carbohydrate ether of the presently described technology, wherein a DMAPA amidoamine with a vegetable oil hydrophobe forms the two cationic fragments, epichlorohydrin provides the two linker fragments, and sucrose provides a carbohydrate fragment. The linker fragments represented in FIG. 2 are hydrophilic carbohydrate derivatives, formed from glycerol with one primary hydroxyl replaced by the nitrogen atom of the quaternary ammonium group, and the oxygen atom of the other primary hydroxyl participating in an ether bond to sucrose.

A person skilled in the art will understand that in actual production, the cationic carbohydrate ether of the present technology generally does not comprise a single chemical compound, but instead comprises a distribution of similar chemical compounds with one or more of each of the fragments. The final distribution of the fragments in the composition is a function of the ratio of the fragments in the raw materials used to prepare the cationic carbohydrate ether (stoichiometry), and also a function of the process used to prepare the cationic carbohydrate ether. Compositional variations are effected by the combination of stoichiometry and process for the purpose of controlling the behavior of the compositions in aqueous solutions. Solution properties of compositions comprising cationic carbohydrate ethers can, for example, cover a broad range of solubilities or viscosities over a broad range of salinity or pH.

The carbohydrate fragments in the CCEs of the presently described technology comprise polyhydroxy or substituted polyhydroxy chains (linear or branched) and/or rings. Preferably, the carbohydrate fragment contains two or more, more preferably three or more hydroxyl groups, alkoxylated hydroxyl groups, alkylated hydroxyl groups, or a combination thereof, and can be derived from any carbohydrates. Examples of carbohydrates include, but are not limited to, sucrose, sucralose, glucose, fructose, lactose, maltose, glyceraldehyde, dihydroxyacetone, erythrose, ribose, ribulose, xylose, xylulose, galactose, mannose, sedoheptulose, neuraminic acid, dextrin, mannitol, sorbitol, gluconic acid, glucuronic acid, derivatives thereof, etc. Other carbohydrates such as glycerols (e.g., glycerol, di-glycerol, tri-glycerol, and the like as well as any polyglycerol mixture), derivatives thereof, and combinations thereof may also be used.

In a preferred embodiment of the present technology, at least one of the linker fragments in the cationic carbohydrate ether is bonded to more than one carbohydrate fragment through ether groups. A linker fragment linking two different carbohydrate fragments need not bear a quaternary ammonium group and connect to a cationic fragment, so long as at least one linker fragment on any of the linked carbohydrate fragments does connect to a quaternary ammonium group in a cationic fragment. For example, in compound C of FIG. 1, the linker fragment connecting the two carbohydrate fragments is not connected to a cationic fragment. Further, it is inherent to the processes used to prepare cationic carbohydrate ethers (CCEs) that some ether-linked carbohydrate groups may not have cationic substituents, and thus remain nonionic. It is a goal of the processes used in this technology to minimize the formation of nonionic components in CCE compositions.

A benefit of the carbohydrate ether linkage is their chemical stability. Ethers are relatively stable chemical groups that are not subject to hydrolysis or substitution reactions under use conditions. Because of the relative non-reactivity of the ether bond, simple ethers such as diethyl ether, methyl t-butyl ether, or diphenyl ether can be used as solvents in chemical syntheses where inert solvents are required.

Another advantage of the CCE compositions of the present technology is their solubility in common organic solvents, such as methanol, ethanol, or isopropyl alcohol. Sugars, such as glucose or sucrose, have very low or essentially no solubility in these solvents. Polysaccharides such as starch, cellulose, or guar are essentially insoluble in the solvents.

Carbohydrate fragments of the CCE composition may also be linked through linker fragments which are amine substituted. For examples, an amine molecule having more than one chemical functional group that can form an ether linkage to a carbohydrate can be used as a hydrophilic linker substrate to join multiple carbohydrate fragments. Polyamines linkers are another example of hydrophilic linkers. The amine groups in linker fragments are not necessarily quaternary.

Because of the plurality of hydroxyl groups in carbohydrates, chains of ether-linked carbohydrates can form, and the chains can be branched with additional carbohydrate groups. These chains are distinctly different from polysaccharides, because the links forming the chains and branch points are not glycosidic, but are ether links. Polymeric and oligomeric cationic carbohydrate ethers of the present technology typically have much lower molecular weights than do, for example, polysaccharides such as starches and cellulose. It is expected that at least one order of magnitude differentiates the molecular weight of cationic carbohydrate ethers from typical molecular weight of polysaccharides such as cellulose, guar, or starch. It is expected that a CCE composition of the present technology has a weight average molecular weight up to on the order of about $10^3$ Daltons, while the mentioned polysaccharides typically have average molecular weights range from about $1\times10^4$ to over $1\times10^6$ Daltons. The lower molecular weights of cationic carbohydrate ethers of the present technology can avoid at least some disadvantages of polysaccharides, such as difficulties in handling and use which include, for example, difficulty of dissolution and removal.

In some preferred embodiments of the present technology, a CCE composition can comprise polymeric or oligomeric substituted carbohydrates (or mixtures of polymers and oligomers). This can happen, for example, when epichlorohydrin is used to link sugar groups through the formation of di-glyceryl sugar ethers. Glycerol is the simplest sugar alcohol, thus the polymer or oligomer is a poly-carbohydrate. A CCE comprising such oligomeric or polymeric chains can also be substituted with one or more cationic fragments with quaternary ammonium groups pendant to each chain.

When a cationic carbohydrate ether (CCE) of the present technology comprises groups that are essentially hydrophobic (i.e., hydrophobes), the CCE can have surface activity in aqueous solutions. The CCE is thus a surfactant. Preferably, the nature of the surface activity can be controlled by varying the degree of hydrophobicity of the CCE, primarily through the stoichiometry and composition of the reactants. Surface activity includes, for example, surface tension reduction, wetting, foaming, emulsification, demulsification, and detergency. Surface tension can also be controlled by the degree of carbohydrate to carbohydrate ether linkage, since this increases molecular size, which affects surface activity.

Cationic carbohydrate ethers of the present technology need not comprise hydrophobes, especially when, for example, they are used as demulsifiers, clay stabilizers, or humectants.

In accordance with some embodiments of the present technology, however, the cationic carbohydrate ethers of the presently described technology can preferably contain one or more hydrophobes. More preferably, at least one of the one or more cationic fragments in the cationic carbohydrate ether of the presently described technology contains one or more hydrophobe. In accordance with at least some embodiments of the presently described technology, at least a portion of the hydrophobes in the cationic carbohydrate ether molecule, preferably at least a portion of the hydrophobes in the cationic fragment(s) comprises a hydrocarbyl or substituted hydrocarbyl group having from about 13 to about 40 carbon atoms. In at least one preferred embodiment, at least one hydrophobe in the cationic carbohydrate ether of the present technology is derived from a carboxylic acid. Preferred carboxylic acids for use with the present technology have from about 13 to about 40 carbon atoms, and more preferably have from about 16 to about 22 carbon atoms.

In at least one preferred embodiment, the carboxylic acid is a fatty acid, such as one derived from an animal or vegetable oil. Carboxylic acids derived from fatty acids typically contain from about 8 to about 24 carbon atoms.

Carboxylic acids (and their derivatives, including but not limited to esters, carboxamides, carboxamidines, anhydrides, acyl chlorides and nitriles) may also be derived from other sources. Carboxylic acids from other sources offer a wider variety of structures than do those found in common fatty acids (mostly linear chains), such as cyclic, aromatic, and polyfunctional compounds. Non-fatty acid derived carboxylic acids may be used with the present technology when their structural features impart useful properties to the viscoelastic compositions. Examples of useful structural features include aromatic rings, which are rigid and approximately planar.

Preferably, at least one hydrophobe is chemically bonded to a substituent on the cationic nitrogen atom of a cationic fragment through either an ester, carboxamide, or carboxamidine functional group. Hydrophobes may also be bonded to the linker fragments of the cationic carbohydrate ether molecules through ester, carboxamide, or carboxamidine functional groups. Not being bound by any particular theory, it is believed that surfactants in which the hydrophobes are attached through these functional groups are biodegraded more easily than those in which the hydrophobes are attached as hydrocarbyl functional groups because they can undergo hydrolytic cleavage of the amine group from the hydrocarbon hydrophobe.

Further, the carbohydrate-ether grouping offers multiple pathways for oxidative degradation and imposes less oxygen demand for degradation than do, for example, hydrocarbon groups, which are at a lower initial level of oxidation than carbohydrate groups. Therefore, at least some cationic carbohydrate ethers of the present technology are more susceptible than conventional alkylamine cationic compounds to natural chemical degradation processes such as hydrolysis or oxidation. As a result, one or more of the CCE compositions of the present technology can degrade in the environment faster than conventional alkylamine cationic compounds. Therefore, another notable advantage in one or more preferred embodiments of the present technology is the ease of degradation of cationic carbohydrate ethers (CCEs) after their use or disposal. And therefore, some embodiments of the chemical compounds of the present technology are expected to be less environmentally harmful and accumulate less in the environment than conventional alkylamine cationic compounds.

The cationic fragments in the cationic carbohydrate ethers of the presently described technology can be derived from any amines or polyamines, preferably tertiary amines or secondary amines, wherein quaternary ammonium sites can be formed. Such amines may include, but are not limited to amidoamines, ester amines, alkylamines, or alkanolamines. Preferred amines are substituted with from one (1) to four (4) aliphatic, cycloaliphatic, or aromatic groups. More preferably, at least one of the aliphatic, cycloaliphatic, or aromatic groups comprises a hydrocarbyl group or substituted hydrocarbyl group having from about 13 to about 40 carbon atoms. Quaternary amino groups must be substituted with four aliphatic or aromatic groups, in any combination.

Examples of amines suitable for making the cationic carbohydrate ethers of the present technology include, but are not limited to, amidopropyldimethylamines derived from fatty acids (e.g., stearic acid, oleic acid, etc.) and 3-dimethylaminopropyl-1-amine (DMAPA), ester amines derived from $C_{8-24}$ carboxylic acid and triethanolamine, 1-hydroxyethyl-2-heptadecenyl-2-imidazoline, bis-hydroxyethyl-alkylamines, tallow ethoxylate amine derivatives, erucyl-dihydroxyethylamine derived from high erucic rapeseed oil (HEAR), soya-amidoamines derived from soybean oil, di-amidoamines derived from diethylenetriamine and a fatty acid or equivalent thereof, dimethyl oleylamine, tallow primary amines, ethylenediamine, dimethyl-alkylamines, mono-methyl-alkyl amines, bis-dimethylaminopropylurea, derivatives thereof, and combinations thereof.

In most cases, each linker fragment in the cationic carbohydrate ether (CCE) molecules of the presently described technology is derived from a molecule which is capable of undergoing two or more substitution reactions. In different embodiments of the present technology, the linker fragment can be derived from various sources. For example, any molecule that has two suitable leaving groups can serve as a substrate to form the linker fragment in the CCE molecule of the presently described technology.

The linker may be hydrophilic, hydrophobic or essentially neither. The presence of both electrically charged and/or polar atoms (which are hydrophilic) and hydrophobe(s) in the linker promotes the surface activity of the molecule. In some embodiments, preferred linkers are hydrophilic, in that they have atoms capable of forming hydrogen bonds with water or other polar molecules. In some other embodiments, preferred linkers can be, for example, hydrophobic rigid planar groups, such as aromatic rings.

In accordance with at least some embodiments of the present technology, the linker fragment can be a member selected from the group consisting of hydrocarbyl groups having from about 2 to about 30 carbon atoms, and substituted hydrocarbyl groups having from about 2 to about 30 carbon atoms. For example, in some embodiments of the present technology, the linker comprises hydrocarbyl groups having from about 3 to about 8 carbon atoms or substituted hydrocarbyl groups having from about 3 to about 8 carbon atoms. In preferred embodiments of this type, the linker has a linear configuration. As another example, in some embodiments of the present technology, the linker comprises hydrocarbyl groups having from about 9 to about 21 carbon atoms or substituted hydrocarbyl groups having from about 9 to about 21 carbon atoms. In preferred embodiments of this type, the linker has a configuration comprising a ring structure.

In some embodiments of the present technology where any of the linker is a substituted hydrocarbyl group, the hydrocarbyl group can have one or more substituents selected from hydroxyl (—OH), alkoxy, aryloxy, carbonate ester, carbamate, sulfonate, phosphinate, phosphite, phosphate, phosphonate, or combinations thereof. In some such embodiments, the alkoxy or aryloxy substituents have the general formula —OR, where R is a hydrocarbyl group having from about 1 to about 4 carbon atoms.

The linker can be derived from, for example, a di-sulfonic acid ester of a primary diol, a secondary diol, a derivative thereof, or a combination thereof. As another example, the linker can be derived from an epihalohydrin or a derivative thereof (e.g., 3-chloro-2-hydroxyl-propanesulfonate). Further, the linker can be derived from a bis-glycidyl ether (e.g., resorcinol di-glycidyl ether). In general, poly-glycidyl ethers, or compounds capable of forming poly-glycidyl ethers in situ can be used.

In at least some embodiments, the linker can be derived from a di-haloalkyl hydrocarbon containing from about 2 to about 18 carbon atoms in which the two halogen atoms are attached to different primary or secondary saturated carbon atoms. In some such embodiments, preferably, the two halogen atoms are different. In some such embodiments, the di-haloalkyl hydrocarbon can be substituted with one or more additional hydroxyl (—OH), alkoxy, or aryloxy (—OR, where R is a hydrocarbyl group having from about 1 to about 24 carbon atoms) substituents, and preferably, the additional substituents are not attached to one of the halogen-bearing carbon atoms. In some preferred embodiments, the di-haloalkyl hydrocarbon is selected from dichloroethane, 1,3-dichloro-2-propanol, 1,4-dibromobutane, di-(chloromethyl) benzenes or derivatives thereof. Further, in some other preferred embodiments, the di-haloalkyl hydrocarbon can have a primary bromoalkyl group and a secondary chloroalkyl group.

More preferred linker precursors include, for example, epichlorohydrin, 1,3-dichloro-2-propanol, bis-3-chloro-2-hydroxy ether, bis-phenol A diglycidyl ether, and combinations thereof. Other preferred linker precursors include, for example, resorcinol diglycidyl ether, glycerol diglycidyl ether, ethylene glycol diglycidyl ether, and combinations thereof. Preferred amino precursors that can be derived from the linker precursors and amines (which are precursors for the cationic fragments) include, for example, 3-chloro-2-hydroxy quaternary ammonium halides, glycidyl quaternary ammonium halides, di-(3-chloro-2-hydroxypropyl) amines, and combinations thereof.

Chemical reactions that can be used to form cationic carbohydrate ethers of present technology can be similar to those for forming other cationic ether compounds as described in many references. Any processes or materials that can achieve the desired compositions are acceptable.

Formation of a carbohydrate ether link can be effected by, for example, replacement of a hydrogen atom on an alcoholic carbohydrate hydroxyl with a carbon atom on the linker substrate. Generally, the new ether bond is formed at the expense of, for example, a carbon-oxygen (C—O) bond (e.g., in the case of glycidyl compounds) or at the expense of a carbon-halogen bond (e.g., in the case of epichlorohydrin). In at least some preferred embodiments of the present technology, the formation of ether links in this manner is subject to the proviso that the carbon atom replacing the hydrogen atom to form the ether bond cannot be covalently bonded to any atoms other than the one oxygen from the carbohydrate fragment, hydrogen, and carbon in the final reaction product. Specifically, if the specified carbon atom is bonded to another oxygen, sulfur, halogen or nitrogen atom, then the newly formed group is not, in fact, an ether, but rather an acetal, ketal, or one of their derivatives which are convertible to aldehydes or ketones on hydrolysis.

Quaternization of tertiary amines can be effected by reaction of aliphatic halide compounds with tertiary amines, forming a quaternary ammonium halide salt. Aliphatic sulfates and aliphatic sulfonate esters can also quaternize tertiary amines, to form quaternary ammonium sulfates or quaternary ammonium sulfonate salts.

Reactants in a preferred process for making a CCE composition include a tertiary amine (or a mixture of tertiary amines), epichlorohydrin, and a carbohydrate (or a mixture of carbohydrates). The process can be conducted such that alkoxylation of the carbohydrate hydroxyls and quaternization of the tertiary amine nitrogen atoms are concurrent for at least a portion of the process. One example of the preferred process is a timed addition of epichlorohydrin to a solution of carbohydrate and tertiary amine. The reactive environment is rich in both hydroxyls from the carbohydrate, and nitrogen atoms from the tertiary amine. The tertiary amine acts as a basic catalyst to promote alkoxylation via the epoxide group of epichlorohydrin, which forms the carbohydrate 3-chloro-2-hydroxypropyl ethers. A concurrent reaction can occur between the chloromethyl group of epichlorohydrin or of 3-chloro-2-hydroxypropyl ethers and the tertiary amine to quaternize the tertiary amine groups. Epichlorohydrin can be added gradually so that for at least a substantial portion of the reaction, the carbohydrate and tertiary amine are present in large excess relative to the epichlorohydrin.

As formation of quaternary amino salts produces halide anions, halide anion can compete with the alkoxylation process by reaction with epoxide groups, forming, for example, 1,3-dichloro-2-propanol (DCP) from epichlorohydrin. Thus, an equivalent of DCP can react with two equivalents of tertiary amine to produce a Gemini quaternary ammonium compound (GQ). High pressure liquid chromatography of CCE reaction mixtures has indicated the presence of compounds with about the same retention times and distributions as GQs made from the same tertiary amines.

Quaternization of tertiary amines is not the only reaction that can occur between alkyl halide groups and tertiary amines. For example, dehydrohalogenation can also occur. With primary alkyl halide groups, such as chloromethyl groups, dehydrohalogenation is expected to be less favored relative to alkylation of the tertiary amine, except in the case where the primary alkyl halide forms a halohydrin. That is, the adjacent carbon atom to the carbon atom of the primary alkyl halide group is substituted with a hydroxyl group. This is believed to be the case with 3-chloro-2-hydroxypropyl ethers. In the case of halohydrins, dehydrohalogenation can be a significant reaction path with tertiary amines, especially when tertiary amines are sterically hindered so that they are poor nucleophiles. As is known by those skilled in the art, sterically hindered tertiary amines can be a reactant of choice in dehydrohalogenation reactions. The products of dehydrohalogenation of a halohydrin and tertiary amines are an epoxide and the hydrochloride salt of the tertiary amine. In the case of DCP, dehydrohalogenation results in the reformation of epichlorohydrin which can go on to produce quaternary amino groups or carbohydrate ether groups, or both. In the case of 3-chloro-2-hydroxypropyl ethers of carbohydrates, the product is a carbohydrate glycidyl ether. A carbohydrate glycidyl ether can react with a second carbohydrate group to link two different carbohydrate groups through hydrolytically stable ether groups. Such a group can be referred to as a bis-carbohydrate ether. Carbohydrate glycidyl groups can also react with halide anions to form 3-chloro-2-hydroxypropyl ethers, which reaction is the reverse of the dehydrohalogenation reaction and also regenerates an equivalent of tertiary amine from the amine hydrochloride salt.

Other reactions can occur during this process. Reactions between epoxide groups and solvent can create additional reaction pathways. For example, water used to dissolve sugar can react with epichlorohydrin to make 3-chloro-1,2-propanediol. With its primary hydroxyl, 3-chloro-1,2-propanediol is relatively reactive to opening epoxide rings, so can continue to react with epichlorohydrin to form bis-3-chloro-2-hydroxypropyl ether. Since the molar concentration of water is substantial relative to the other reactants in some preferred embodiments, this reaction pathway is significant in determining the final CCE composition. Through the reaction paths described earlier, e.g., dehydrohalogenation and amine quaternization, bis-3-chloro-2-hydroxypropyl ether can go on to react with carbohydrates to form bis-carbohydrate ethers, to react with tertiary amines to form bis-cationic carbohydrate ethers, or to react with tertiary amine and carbohydrate to form other cationic carbohydrate ethers.

Another process for preparing a CCE composition can start with, for example, reaction between amines and linker precursors. For example, tertiary amine hydrochloride salt can react with epichlorohydrin to make 3-chloro-2-hydroxypropyl quaternary ammonium halide salts (quaternary ammonium halohydrins). This material can then be mixed with a carbohydrate, and etherification can be effected by dehydrohalogenation of the quaternary ammonium halohydrins to form glycidyl quaternary ammonium compounds, which can then alkoxylate a carbohydrate to form a CCE. In this process, preferably, at least a full equivalent of base is utilized to effect dehydrohalogenation of the 3-chloro-2-hydroxypropyl ethers, and thus a full equivalent of the halide salt of the base can be formed in the process. Common bases that can render aqueous solutions alkaline are suitable, which include, for example, alkaline metal hydroxides or carbonates, alkaline earth metal oxides or hydroxides, and mixtures thereof. This is a process well documented in the preparation of cationic starches, with numerous process variations.

In another embodiment, polyphenols or bis-phenols can be used as linker precursors for forming ether bonds with carbohydrates. For example, resorcinol bis-glycidyl ether or bisphenol A di-glycidyl ether can react with carbohydrate hydroxyls to form bis-phenyl-carbohydrate ethers. Alternatively, carbohydrate 3-chloro-2-hydroxypropyl ethers can be reacted with phenols (through glycidyl intermediates formed from dehydrohalogenation) to form phenyl-carbohydrate ether derivatives.

In accordance with some embodiments of the present technology, polyphenols can react with either carbohydrate polyhalohydrins or carbohydrate poly-glycidyl ethers under alkaline conditions to form poly-carbohydrates linked by phenyl ethers. For example, sodium salts of resorcinol can react with a di-halohydrin substituted polyether of a mixture of glucose and sucrose. The benefit of these embodiments is that they use a rigid linker which is also planar. When the poly-carbohydrates linked by phenyl ethers are combined with cationic fragments through subsequent reaction, some of the resultant cationic carbohydrate ethers can be expected to have benefits, for example, as corrosion inhibitors.

In another embodiment, an amino group on the cationic fragment can be linked to more than one carbohydrate fragments through linker fragments. For example, a primary amine can react with two equivalents of epichlorohydrin to form a bis-3-chloro-2-hydroxypropyl tertiary amine. Since this intermediate has two 3-chloro-2-hydroxypropyl groups which can be converted to glycidyl groups, it can form links with multiple carbohydrate groups. The tertiary amine can then be quaternized with, for example, an additional alkyl halide or similar group. When tertiary amines become crowded with multiple large bulky groups, quaternization can sometimes only be effected with very reactive alkylating agents, such as methyl chloride or dimethyl sulfate.

In another embodiment, alkoxylated carbohydrates can be used as precursors for the carbohydrate fragments. In accordance with this embodiment, some or all of the hydroxyl groups of a carbohydrate can be alkoxylated to form alkoxy, hydroxyalkoxy, aryloxy, etc. For example, a blend of sucrose and glycerol can be propoxylated to obtain a material that is a clear fluid at room temperature. Examples of suitable alkoxylated carbohydrates are Carpol GSP-280 and Carpol GSP-355 available from Carpenter Co., Richmond, Va.

In one preferred embodiment, epichlorohydrin is used at a molar amount that exceeds the combined molar amount of carbohydrates and tertiary amines. This can accomplish quaternization of the tertiary amino groups at a faster rate than when molar ratios are closer to equal, and it provides an excess of glycidyl groups or 3-chloro-2-hydroxypropyl groups which can then form additional carbohydrate ether linkages.

Yet another preferred embodiment of the presently described technology utilizes a process in which alkoxylation and amine quaternization are not concurrent. For example, in this process, a carbohydrate composition can be alkoxylated to form carbohydrate ethers. This can be effected by reaction of linker precursors such as epichlorohydrin with the carbohydrates under Lewis acid catalysis, so that chloromethyl groups are not reacted as they typically are when alkoxylation is conducted under basic catalysis. The alkoxylation variations attainable with both acid and base catalysis are known to those skilled in the art. Alkoxylation of carbohydrates by epichlorohydrin can also be effected under base catalysis, but the halohydrins formed typically go on to react with the base in a dehydrohalogenation as described earlier. The dehydrohalogenation reaction consumes the base, so that a full equivalent of base or more is required for complete alkoxylation by epichlorohydrin. By complete alkoxylation, it is meant that one equivalent of epichlorohydrin forms two ether links. This can be a desirable effect, since it results in the formation of bis-carbohydrate ethers. When no chloromethyl groups remain unreacted in this step, cationic ether links can be created in an additional step using one of the processes described earlier, for example, concurrent alkoxylation and amine quaternization with additional epichlorohydrin.

Carbohydrate compositions can also be alkoxylated with other epoxide compounds, such as ethylene, propylene, butylene, or styrene epoxides. These other epoxides can be reacted with carbohydrate compositions concurrently with epichlorohydrin to form polyether chains with randomly mixed chloromethyl pendant groups in the polyether chain, or the epoxide can be reacted sequentially so that essentially homogeneous polyether blocks are formed. Processes for making random and block polyethers from epoxide combinations are documented and known to those skilled in the art.

One aspect of at least some processes involving epichlorohydrin, halohydrins, or di-halohydrins is the completeness of reaction of all alkyl halide groups. Reaction completeness of these groups can be determined by, for example, potentiometric titration with $AgNO_3$, a technique known to those skilled in the art. To achieve reaction completeness, small amounts of alkaline material can be added to the compositions to effect dehydrohalogenation of halohydrins until essentially all of the chloride atoms are accounted for in the anionic chloride form. Without being bound by any particular theory, it is believed that this can remove potentially hazardous components from the composition, and also promote additional ether links with carbohydrates.

Conversion of residual amounts of haloalkyl (i.e., alkyl halide) groups can be effected using, for example, slight excess of base, such as sodium, potassium or calcium hydroxides. Ammonia, primary amines, and secondary amines can reduce residual haloalkyl groups as well. Preferred amines for this purpose are ammonia, and primary or secondary amines with substituents that are not sterically hindering, typically groups of 1-4 carbon atoms, optionally with hydroxyl substituents. Conversion of residual haloalkyl groups to halide can also be effected using sulfite salts, preferably sodium sulfite. This reaction replaces the halogen atom of the haloalkyl groups with a sulfonate anionic group. This reaction can be called "sulfitation," and can be used to convert larger portions of haloalkyl groups to sulfonate anionic groups to form zwitterionic compositions of carbohydrate ethers.

Another measurement that can be used to measure reaction completeness is degree of quaternization. Quaternary ammonium surfactants can be determined by potentiometric titration with a solution of sodium lauryl sulfate (SLS), as is known by those skilled in the art. Another method of determining quaternary ammonium content is by titration of the CCE composition in a solution of mercuric acetate in acetic acid, using perchloric acid as titrant. This latter method, known to those skilled in the art, can particularly useful for cationic carbohydrate ethers that do not contain hydrophobic groups and cannot form complexes with SLS.

In another embodiment of the presently described technology, cationic carbohydrate ethers can be prepared in such a manner that the resultant product molecules have at least two or more free hydroxyl functional groups. Without being bound by any particular theory, it is believed that in so doing, enhanced thickening and/or viscoelasticity can be achieved with compositions comprising such compounds through the addition of agents that can cross-link the hydroxy groups.

Examples of cross-linking agents that may be useful in the presently described technology include, for example, boric acid (and salts thereof), tetra-alkoxy titanates (and derivatives thereof), or tetra-alkoxy zirconates (and derivatives thereof). Through cross-linking, highly networked structures may be formed that can provide thickening similar to that obtained with polysaccharides such as guar or starch. However, unlike such polysaccharide compounds, cationic carbohydrate ethers of the presently described technology tend to degrade more readily to lower molecular weight compounds, such as, for example, through hydrolysis reactions of amide linkages. As compounds of the presently described technology breakdown through such reactions, it is believed that their viscosity decreases, thereby further facilitating their enhanced removal in various applications such as oil well drilling.

In yet another embodiment of the presently described technology, cationic carbohydrate ethers with free hydroxyl functional groups can be further treated with suitable reactants to substitute the hydroxyl groups with other functional groups or substituents. For example, the free hydroxyl groups can be alkoxylated to form alkoxy, hydroxyalkoxy, aryloxy, etc.

Further, the cationic carbohydrate ethers of the presently described technology may also include anionic substituents including, but not limited to, sulfonate, carboxylate, phosphate, phosphonate or phosphinate anionic substituents.

In accordance with some embodiments of the present technology, zwitterionic cationic carbohydrate ethers can be produced. This can be easily effected by, for example, reacting at least one of the haloalkyl groups on a linker substrate with tertiary amine to make quaternary ammonium groups, and reacting the remainder of the haloalkyl groups with sulfite salts (e.g. sodium sulfite). The result is a CCE composition in which at least some of the molecules have one or more of each of an anionic sulfonate group and a cationic quaternary ammonium group. These can be thought of as a type of "internal salt," and are also called sulfobetaines or hydroxysultaines. Cationic carbohydrate ethers of this type can be made from, for example: (1) carbohydrates for the carbohydrate fragments; (2) tertiary alkyl amines or amidoamines for the cationic fragments; and (3) 3-chloro-2-hydroxy-sulfonate salts (sodium, typically), which is the reaction product of epichlorohydrin and sodium sulfite and/or sodium bisulfite, for the linker fragments.

Viscoelastic compositions of the present technology, such as viscoelastic solutions or gels, can be prepared by combining cationic carbohydrate ethers of the present technology with water, and optionally with additional additives, such as inorganic salts, anionic hydrotropes or surfactants, other viscoelastic surfactants, or other useful organic compounds (such as carboxylic or polycarboxylic acids). The order of mixing is not particularly important to achieve a viscoelastic composition.

Typically, viscoelastic solutions can be prepared through dissolution of gellant compounds in base solutions. Any suitable mechanical means for obtaining a homogeneous solution is acceptable. Base solutions normally provide the bulk of the viscoelastic solutions or gels, typically up to about 90% or greater by weight. Base solutions can be made in water. Base solutions can also contain salt(s), and can have up to about 65 wt %, alternatively up to about 75%, alternatively up to about 80 wt % salt. Metal (or ammonium) halide salts are used most commonly, but other inorganic mineral acid salts may also be used. Alternatively, the base solution may be a polar organic compound dissolved in water. Non-exhaustive examples of such compounds include salicylic acid (or salts thereof), phthalic acids (or salts thereof), or organic sulfonic acids (or salts thereof).

When preparing viscoelastic gels, air bubbles are frequently trapped in the gels and should be removed before accurate viscosity measurements can be made. Centrifugation, ultrasonication in warm water baths, and heating in ovens at between about 70° C. and about 80° C. overnight can be used, for example, to produce bubble-free gels.

In at least some embodiments, cationic carbohydrate ethers of the present technology can be provided in the form of a concentrated solution in an organic solvent (e.g., alcohols, ketones, or glycol ethers) before being mixed with water to make an aqueous viscoelastic composition for a specific application. For example, when used as a gelling agent, the cationic carbohydrate ethers of the present technology can first be dissolved in an alcohol, such as isopropyl alcohol, preferably with some water, to make a concentrated solution, in which the concentration of the active ingredient can be made as high as possible while maintaining desirable handling properties, such as fluidity. Suitable concentrations of the cationic carbohydrate ethers of the presently described technology can range from about 20% to about 60%, or higher, by weight. The concentrated cationic carbohydrate ether solution can then be added to water, or a water solution of salt, organic acids, etc., with mixing to make a viscoelastic composition (such as a solution or gel) containing an effective amount of the cationic carbohydrate ether of the present technology suitable for use in one or more oil field applications.

In accordance with some embodiments, cationic carbohydrate ethers of the present technology can be used in combination with other cationic viscoelastic surfactants, which are normally viscoelastic quaternary ammonium compounds. At least some viscoelastic solutions of cationic carbohydrate ethers of the presently described technology are believed to also impart an improved salt stability and/or acid solubility to other, secondary cationic viscoelastic surfactants. For example, combinations of some embodiments of the presently described cationic carbohydrate ethers with either bis-quaternary ammonium compounds or erucyl-N,N-di-(2-hydroxyethyl)-N-methylammonium chloride can be made into clear viscoelastic solutions at higher potassium chloride concentrations than can be used with either of the secondary surfactants alone. Formulation of a combination of at least one CCE composition with at least one secondary cationic viscoelastic surfactant is one of the preferred embodiments of the presently described technology. The ratio of the CCE composition to secondary cationic viscoelastic surfactant in any such combination formulations can be varied, for example, to effect control over relationships between viscosity, temperature, and shear rate relationships across an expanded range of salt concentrations.

When used as oil field fluids, viscoelastic compositions of the presently described technology are generally thickened aqueous compositions comprising, preferably less than about 15 wt %, more preferably less than about 10 wt % of cationic carbohydrate ethers (CCEs) of the present technology. When the CCEs of the present technology are used in combination with other viscoelastic quaternary ammonium compounds, the total amount of all viscoelastic quaternary ammonium compounds is preferably less than about 15%, more preferably less than about 10% by weight based on the total weight of the viscoelastic composition. For example, in some embodiments, viscoelastic compositions can comprise from about 5 wt % to about 8 wt % of CCEs of the present technology, alternatively from about 5 wt % to about 8 wt % of all viscoelastic quaternary ammonium compounds. In some other embodiments, viscoelastic compositions can comprise from about 0.05% to about 5% by weight of CCEs of the present technology, alternatively from about 0.05% to about 5% by weight of all viscoelastic quaternary ammonium compounds.

More specifically, viscoelastic compositions of the present technology can comprise any amount of cationic carbohydrate ethers of the present technology less than about 15 wt %, such as about 10 wt %, 8 wt %, about 6 wt %, about 5 wt %, about 4 wt %, about 3 wt %, about 2.5 wt %, about 2 wt %, about 1.5 wt %, or about 1 wt %. In some embodiments, viscoelastic compositions of the present technology can comprise less than about 1 wt % cationic carbohydrate ethers, such as about 0.75% wt %, about 0.5 wt %, about 0.25 wt %, about 0.1 wt %, 0.08 wt %, or about 0.05 wt %. Some preferred viscoelastic compositions of the present technology comprise from about 0.05 wt % to about 5 wt %, from about 0.25 wt % to about 4 wt %, or from about 0.25 wt % to about 3 wt %, of cationic carbohydrate ethers of the present technology.

Additives, such as inorganic salts (electrolytes), organic acids, salts of organic acids, poly acids, salts of poly acids, di-acids, salts of di-acids, anionic surfactants, anionic hydrotropes, other viscoelastic surfactants, or combinations thereof, can be added to viscoelastic compositions of the present technology depending on the demands of the particular application. Some additives can impart higher viscosities to viscoelastic solutions at elevated temperatures, as compared to the same systems without these additives. However, additives are not required in all applications and compositions of the present technology.

Inorganic salts that can be useful as additives in viscoelastic compositions include, for example, halide salts (predominantly bromides and chlorides) of alkali metals (such as sodium, potassium, cesium) and alkaline earth metals (such as calcium and magnesium). Some preferred inorganic salts for use in viscoelastic solutions of the present technology include, but are not limited to, sodium chloride (NaCl), potassium chloride (KCl), ammonium chloride ($NH_4Cl$), calcium chloride ($CaCl_2$), sodium bromide (NaBr), calcium bromide ($CaBr_2$), and zinc bromide ($ZnBr_2$), potassium formate (KHCOO), cesium chloride (CsCl), cesium bromide (CsBr), or combinations thereof.

Examples of other additives include organic acids (e.g., carboxylic or sulfonic acid), di-acids, poly-acids, and salts of these acids. Organic molecules bearing negative charge(s), typically derived from organic acids can be used to provide organic counter ions. For example, ortho-phthalate salts can be prepared by mixing o-phthalic anhydride in water with bases, such as alkali metal hydroxides (NaOH or KOH) or tertiary amines (e.g. triethylamine).

Hydrotropes are also useful in certain circumstances. Examples of suitable hydrotropes can include sodium xylene sulfonate (SXS), sodium cumene sulfonate (SCS), and ammonium xylene sulfonate (AXS). Anionic surfactants may also provide desirable properties in conjunction with certain cationic carbohydrate ethers of the present technology used as active ingredients.

In some preferred embodiments of the present technology for use as viscoelastic wellbore treatment fluids in oil fields, such fluids contain viscoelastic compositions as described above, such as compositions of water and at least one cationic carbohydrate ether of the present technology to control the viscoelasticity of the composition. In some such embodiments, wellbore treatment fluids of the present technology further comprise a proppant. Proppants suitable for use with the present technology can be, but are not limited to, small particles of sand, ceramics, or other hard materials.

Cationic carbohydrate ethers of the present technology tend to have higher viscosities at higher temperatures and higher salt concentrations as compared to conventional NPGs. Preferably, the viscoelasticity of one or more compositions containing an effective amount of polyhydroxyl quats of the present technology can be maintained at a temperature greater than about 80° C., more preferably at a temperature greater than about 100° C., most preferably at a temperature greater than about 110° C.

It has been surprisingly found that the cationic carbohydrate ethers of the presently described technology exhibit some particularly useful and unexpected additional properties. For example, at least some of the cationic carbohydrate ethers have the ability to form viscoelastic gels over a broad range of salt concentrations such as up to about 80 wt % salt(s), alternatively up to about 70 wt % salt(s), alternatively from about 5% to about 60% salt(s). Salt solutions (brines) with salt concentrations above about 20% have densities substantially higher than that of water, and are used in wellbore service fluids for the advantages the higher density or salt concentrations confer. In at least some embodiments of the present technology, a high density brine containing as high as about 20% or more, alternatively about 50% or more, alternatively about 70% or more, by weight of salt(s) can be made into a clear viscoelastic gel or a clear thickened solution with cationic carbohydrate ethers of the presently described technology. For another example, in at least some embodiments, a viscoelastic solution made from the cationic carbohydrate ethers of the presently described technology and containing about 7% by weight or more, alternatively about 10% by weight or more, alternatively about 15% by weight or more, alternatively about 20% by weight or more, potassium chloride (KCl) does not precipitate above the temperature at which the solution is no longer viscoelastic. Without being bound by any particular theory, it is believed that the plurality of hydrophilic hydroxyls in the cationic carbohydrate ethers of the presently described technology promotes the hydrophilicity of the cationic carbohydrate ethers, and thus improves the solubility of the cationic carbohydrate ethers. This can in turn improve the salt stability and/or acid solubility of the viscoelastic solutions comprising the cationic carbohydrate ethers of the present technology.

Exemplary Applications of CCE Compositions

Cationic carbohydrate ethers (CCEs) of the present technology are suitable for a wide variety of applications where thickened or gelled aqueous compositions are desired, including in agriculture, cleaners, personal care, disinfectants, gene transfer, etc.

For example, sprayed pesticides sometimes utilize additives to minimize spray drift. Some CCE compositions of the present technology can be used as drift control agents to reduce spray drift.

For another example, gels formed from cationic carbohydrate ethers of the present technology can be used to suspend granular pesticides, and other water insoluble agents. It is known that certain pesticides can be used in acid or acid salt form, such as the herbicide 2,4-dichlorophenoxyacetic acid. An acid pesticide can be incorporated into a process for preparing CCE compositions of the present technology, such that the pesticide acid provides at least a portion of the counter ions to the cationic sites. Such compositions are multipurpose, in that the viscous gel will stick to leaves of the target plants to deliver more efficiently the herbicidal component. Such compositions can also be formulated with less volatile organic compounds and other inert ingredients (that are released into the environment) than are in current commercial products.

Some CCE compositions of the present technology can be used in cleaners and cleansing gels to improve contact on vertical surfaces. For example, cationic carbohydrate ethers of the present technology can substitute polysaccharides in cleansing gels as those described in U.S. Pat. App. No. 2004/0097385, to Chen, et al., published on May 20, 2004, or can be used to make phase stable viscoelastic cleaning compositions as those described in U.S. Pat. No. 5,833,764, to Rader, et al., issued on Nov. 10, 1998, for opening drains.

Some CCE compositions of the present technology can be used in personal care compositions, such as gel soaps, shampoos and conditioners. Some embodiments of CCE compositions of the present technology can form stable aqueous viscoelastic solutions in water. In some embodiments, such viscoelastic solutions are clear, instead of hazy, opaque, or pearlescent, which can result in enhanced aesthetic properties in personal care compositions. Some embodiments of CCE compositions of the present technology can provide or enhance conditioning properties in personal care compositions for skin and/or hair, such as rinsability, combability (on wet and/or dry hair), feel (on skin and/or hair), detangling, and static control. With respect to specific personal care compositions, some embodiments of CCE compositions of the present technology can be used to substitute for some or all of the surfactants in aqueous viscoelastic surfactant solutions for the cleaning of hair or skin as those described in U.S. Pat. No. 5,965,502, to Balzer, issued on Oct. 12, 1999.

The ability of viscoelastic solutions using cationic carbohydrate ethers of the present technology to form stable suspensions having particulate material suspended therein is also beneficial in the personal care area or other areas. For example, particulates such as anti-dandruff agents, abrasives (e.g., crushed walnut or apricot shells, silica, cellulose), sun block agents (e.g., zinc oxide), pigments and dyes, glitters, and micro-encapsulated materials (e.g., vitamins, minerals, fragrances, polymer beads), can be used in forming viscoelastic suspensions in personal care compositions.

Bleaching agents such as hydrogen peroxide can be gelled using cationic carbohydrate ethers of the present technology to make thickened aqueous bleach compositions. For example, U.S. Pat. No. 4,800,036, issued Jan. 24, 1989 and European Patent No. EP 0298172, issued on Jan. 11, 1989, both to Rose, et al., describe aqueous bleach compositions thickened with a viscoelastic surfactant. Some cationic carbohydrate ethers of the present technology can be used for such applications. Some quaternary compounds of the present technology also have bactericidal properties.

Further, the thickening and viscoelastic properties of viscoelastic compositions of the present technology may be related to vesicle formation, or other phenomena.

As known in the art, micelles demonstrate a variety of forms, such as rod or worm-like. A key characteristic of micelles is that the surfactant molecules that make up the micelles are oriented such that the hydrophilic portions of the molecules form the outer surface around an internal core region, in which the hydrophobe portions of the molecules reside. The radius of the core is approximately equal to the length of the fully extended hydrophobe chain. The average number of surfactant molecules in a micelle is the aggregation number, and can range from several molecules to over a hundred for typical cationic surfactants. Micelles are dynamic structures in equilibrium with free surfactant molecules in solution. Surfactant molecules exchange into and out of micelles with high frequency. Because micelles are too small to be seen by light microscopy, electron microscopy has been used to detect micelles.

Vesicle formation can provide additional useful properties other than thickening. Vesicles are more or less spherical surfactant self-assemblies. Essentially, a vesicle is a bilayer lamellar structure in which the edges have wrapped around and joined each other to form a sphere. Vesicles may have multiple bilayers, which creates concentric spheres. The core of a vesicle is a compartment that contains the aqueous solvent used to dissolve the surfactant initially, but essentially free of surfactants molecules. Vesicles may be manipulated in such a way that the internal compartment is used as a carrier for other molecules. The number of surfactant molecules that make up vesicles is much larger than are in micelles, usually about 10 to about 1000 times larger. Furthermore, although vesicles are also dynamic structures, the rate of exchanges of surfactant molecules in vesicles are much slower than those in micelles. As Zana describes vesicles in *Dynamics of Surfactant Self-Assemblies* (p. 26, 2005), "the lifetime of a vesicle must be extremely long and vesicles can probably be considered as "frozen" on the laboratory times scale (weeks to months or years) (p. 26)" Many vesicles are large enough to be seen under a light microscope.

Another key feature of vesicles is that a vesicle has an inside and an outside. The inside encloses some of the aqueous phase, and possibly other molecules dissolved in the water. Vesicles can be used to deliver entrapped molecules into environments they might not normally have access to because of chemical instabilities, etc. In contrast, the interior of a micelle is in a "quasi-liquid state" according to Zana (see p. 14).

In the area of gene transfer, vesicles are synthetic analogs of liposomes—essentially naturally occurring biological vesicles. Synthetic vesicles can be infused with, for example, drug molecules. The vesicles can then be used to deliver the drug as part of treatment. Cationic vesicles have been found to be useful in gene therapy for the delivery of genetic material. However, conventional alkylamine and ether amine cationic compounds exhibit toxicity to many organisms that limits their in vivo use, while ester amine derived cationic compounds are less toxic but also less stable. The cationic carbohydrate ethers of the present technology, for example, have demonstrated vesicle formation and can be less toxic than alkylamine quats but more stable than ester amine derived quats.

Certain viscoelastic compositions of the present technology can be used in, for example, wellbore treatment fluids, drilling fluids, thickeners, completion fluids, diversion fluids, and many other applications where thickened or gelled aqueous compositions are desired. An example of applications of certain cationic carbohydrate ethers of the preset technology is as a gellant in hydraulic fracturing fluids used in hydrocarbon recovery stimulation processes. In this application, the ability of the fluid to transport proppant (solid particulates) is an essential feature related to the rheology properties imparted to the fluid by the gellant.

Another hydrocarbon recovery stimulation process for which certain cationic carbohydrate ether (CCE) compositions of the present technology are suitable is acidizing. In oil field, acidizing is a process of pumping acid into a wellbore to remove formation damage or other materials so that production is enhanced. An acidizing fluid can contain, for example, about 5 wt % or more, alternatively about 10 wt % or more, alternatively about 15 wt % or more, alternatively about 20 wt % or more of an acid (e.g., HCl) or a mixture of acids. In this process, thickened acids are desirable because they provide more efficient acidizing in certain types of subterranean zones, e.g., low porosity formations. Other acidizing applications use invert emulsions of aqueous acid in an oil, e.g., diesel or kerosene. Some CCE compositions of the presently described technology can be used as acid thickeners or to form invert emulsions with acid and oil. Such CCE compositions of the present technology can thicken acid solutions and also reduce the rate of acid fluid loss into the subterranean formation to increase the efficiency of the acidizing process.

In some acidizing embodiments utilizing a composition comprising a CCE of the present technology, the CCE can perform multiple functions, serving not only to thicken the acid, but also to prevent corrosion of steel pipes and tubing used in a wellbore.

In some other acidizing embodiments, one or more acidizing solutions comprising a CCE of the present technology can transform from a viscous solution to a viscoelastic solution in situ. For example, it has been found that a solution comprising a CCE and 15 wt % HCl that is a viscous solution can become viscoelastic when salts (e.g. $CaCl_2$, $MgCl_2$, KCl) are added to the solution. During an acidizing process utilizing a CCE composition of the present technology, the acid (e.g., HCl) dissolves minerals of calcium, magnesium, etc. to form chloride salts of the minerals. As the concentration of the chloride salts in the acidizing solution increases, the solution can become viscoelastic.

Certain CCE compositions of the present technology can also be used in drilling fluids. The special class of drilling fluids used to drill most deep wells is called drilling muds because of their thick consistency. Drilling muds normally require additional properties beyond simple drilling fluids that can prevent damage to the subterranean formation, prevent drill pipe corrosion and fatigue, and allow the acquisition of information about the formation being drilled. Drilling fluids and muds may be sub-classified according to a number of characteristics, such as fluid phase alkalinity, water or oil continuous phase, etc. Besides cationic carbohydrate ethers of the present technology, drilling mud compositions can further include the traditional ingredients such as bactericides, corrosion inhibitors, emulsifiers, fluid loss and viscosity control agents, shale control additives, etc.

Water based drilling fluids use various polymers as thickeners to increase the viscosity of the drilling fluids and improve the fluids ability to remove cuttings. Some cationic carbohydrate ethers of the presently described technology can be used as thickeners for such drilling fluids or muds.

Thickeners suitable for use in oil based drilling fluids can include organoclays. Such organo materials are clays treated with various compounds to make them compatible with organic fluids. When placed in an oil based drilling fluid, they thicken the fluid, improving the fluids ability to carry the cutting to the surface. Some CCE compositions of the present technology can be used as treatment compositions for making organoclays.

Some drilling fluids are water in oil emulsions. These emulsions often include brines which can adjust the density of the drilling fluid. Controlling the density of the drilling fluid is important to prevent formation damage and lose of drilling fluid. High density drilling fluids provide support to the surrounding formation that, under its own pressure, might collapse into the bore hole if lower density fluids were used. Formation preparation and hydrocarbon recovery would then be more complicated. The high electrolyte strength of high density brines can also reduce the permeation of wellbore fluids into the formation (which must later be recovered), and they may reduce the hydration of shale and clay in the formation. Some cationic carbohydrate ethers of the present technology can be used for thickening or emulsifying the brines in such drilling fluids.

During the drilling operations, the subterranean formation and wellbore casing come into contact with a variety of materials which can have adverse effects on further operations or hydrocarbon production. The casing pipe needs to be cemented and the cement needs to adhere to the formation and some of the various materials used in the drilling fluid can prevent this adhesion. Completion fluids are used to wash these materials from the formation. Since the density of the completion fluids can affect the wellbore similarly to the drilling fluids above, a variety of brines or other materials are used. Hydrocarbons, olefins, etc. are circulated to remove the oil based muds. Gelled "pills" are added to push these materials through the well. The gel forming properties of certain cationic carbohydrate ethers (CCEs) of the present technology can provide compositions for these applications. Furthermore, gel "pills" are pushed through the well with other fluids such as brines, which may require viscosity modification. Some CCEs of the present technology have shown to provide such viscosity modification to a variety of brines and water.

Another function of the completion fluid is to remove particulate matter and remnants of other materials used in the drilling operation from the casing, such as pipe dope. The various materials added to pipe dope can plug the formation and cause damage to the production zones. As these materials are removed from the joints in the casing string, they can settle out in the production zone. By viscosifying the completion fluid, this kind of settling can be minimized. Furthermore, the "filter cake" formed during the drilling operation often requires special treatments, such as enzymes or hydrogen peroxide, to effect sufficient removal. Some CCE compositions of the present technology can provide useful, new or improved compositions for formulation of filter cake removal treatments.

Clear brine completion fluids are used in the process of transitioning a wellbore from a drilling, rework or stimulation process. The brine completion fluids can contain metal salts in the amount of, for example, from about 10 wt % to about 75 wt %, alternatively from about 20 wt % to about 75 wt %. Some completion fluids such as those use zinc bromide, cesium bromides/chlorides, or formate brines are very expensive. In order to get the required cleaning/debris removal, large volumes are conventionally required. Some cationic carbohydrate ethers of the present technology can be used as gelling agents for these expensive compounds to decrease the volumes required by making them more efficient. Furthermore, gelled, poorly wetting brines can be made from some CCE compositions of the present technology that can decrease the amount of expensive brines that leak off into the subterranean formation (often carrying particulates that damage the formation).

Therefore, the ability of CCEs to thicken or gel the special brines used in completion fluids can confer advantages such as improved efficiency, reduced fluid loss and increased recovery of costly and sometimes toxic metal salts. Compared to polysaccharide thickeners, such as guar or hydroxypropyl guar, CCEs of the present technology are expected to exhibit properties similar to those of other cationic surfactant viscoelastic gellants, such as ease of removal from the wellbore and reduced formation damage.

Subterranean formations have different properties, such as different permeability, that can affect the ways in which matters flow into and out of the formations. Certain chemicals can alter the permeability by forming gels that can block matter transport through more porous zones. The matter transport is then diverted to other zones, from which hydrocarbon may be recovered, or into which additional treatments may be applied (e.g. acidizing). Some cationic carbohydrate ethers of the present technology can be used as gelling agents in such diversion fluids.

Certain CCE compositions of the present technology can also be used as additives for various processes in hydrocarbon recovery, for example, in fluid loss control, corrosion inhibition, scale inhibition, clay stabilizing, drag reducing, demulsifying, gas hydrate control, etc.

Fluid loss additives, or filtrate-reducing agents, are often used to minimize the loss of process fluids into the formations during various processes, e.g., drilling or fracturing. This helps avoid certain types of formation damage and reduces the expense of lost process fluids, some of which have high cost. Conventionally, fluid loss prevention can be divided, for example, into three categories by mechanisms, where (1) macroscopic particles clog the formation pores to form a filter cake with reduced permeability, (2) microscopic particles form a gel in the boundary layer between the fluids and the porous formation, and (3) a chemical resin is injected and cured irreversibly in the formation. Some cationic carbohydrate ethers of the present technology can be used as fluid loss additives that can form a gel in the boundary layer to prevent fluid loss.

Corrosion and scale deposition are the two of the most costly problems in oil industries. Corrosion may occur not just in stimulation and recovery operations, but in transport and refining operations also. Some cationic carbohydrate ethers of the present technology can provide useful, new or improved compositions for corrosion inhibition across the various hydrocarbon related operations.

Scale deposition also occurs in various operations in the petroleum industry. Scales may contain carbonates of calcium and iron, sulfates of barium and strontium, iron oxides and sulfides, and magnesium salts. Scale inhibitors may act as thermodynamic inhibitors by reacting or complexing with scale forming substances so that a chemical equilibrium is established that suppresses crystal growth. Polyamines, quaternaries, amino sulfonates and amino phosphonates are a few examples of chemical classes of scale inhibitors. Surfactants may also act as scale inhibitors by suppressing the adherence of crystals to metal surfaces. Some cationic carbohydrate ethers of the present technology provide useful, new or improved scale inhibitors in each of these classes.

It is known that swelling due to clay or shale hydration in subterranean formations is one of the most important causes for borehole instability. Clays may swell as a result of surface hydration, or from osmotic pressure due to cation concentration gradients between the clay and surrounding water. Some cationic carbohydrate ethers of the present technology provide useful and new clay stabilizers that can inhibit or reduce shale hydration.

In oil field applications, chemical additives that can reduce drag can be utilized, for example, in pipelines for liquid transportation, in drilling applications, and in fracturing. The drag on a fluid as it flows through pipes or down bore holes limits the pressures that may be attained, increases equipment demands and costs, and increases energy demands. Certain cationic surfactants are known to be drag reducing agents, and viscoelasticity is also frequently associated with drag reduction. Polymers are also used as drag reducers, but when they are used, one serious problem in the effectiveness of drag reducers is the mechanical chain degradation of polymers by pumps. Some cationic carbohydrate ethers of the present technology provide drag reducers which do not suffer the mechanical degradation by pumps.

When crude oil is produced, most of it occurs emulsified with water. Chemical demulsifiers are used to separate the water from the hydrocarbons before transportation. At refineries, crude oil is sometimes emulsified in fresh water, followed by demulsification, to reduce the salt content of the crude oil. Some CCE compositions of the present technology can provide useful, new or improved compositions that can be used as demulsifiers.

Further, some CCE compositions of the present technology can also function as gas hydrate inhibitors, either as crystal inhibitors or through other mechanisms. Gas hydrates are types of clathrates in which water and hydrocarbons form crystalline addition compounds. The host compound, water, forms crystals, and the guest compound, hydrocarbons such as methane, are held in free spaces between the water crystals. Gas hydrates can form in pipelines, forming solid deposits that reduce pipe diameter or even clog them. Some cationic carbohydrate ethers of the present technology can inhibit the formation of gas hydrates.

The present technology will be better understood by reference to the following examples. These examples are provided to describe specific embodiments of the invention and to demonstrate how they work. By providing these specific examples, the inventors do not limit the scope of the invention. It will be understood by those skilled in the art that the full scope of the invention encompasses the subject matter defined by the claims concluding this specification, and any equivalents of the claims.

EXAMPLES

Example 1

Synthesis of a
Sucrose-Epichlorohydrin-HERAPDMA (1:1.1:1)
Composition

A sucrose-epichlorohydrin-HERAPDMA (1:1.1:1) composition was prepared in this example, which may be referred to as Composition 1.

Sucrose (87.8 g) was dissolved in deionized water (87.9 g) in a beaker with magnetic stirring. This solution was then charged to a glass 4-necked reactor with mechanical stirring, a nitrogen blanket, an addition funnel, a reflux condenser, a thermocouple and a heating mantle with automatic temperature control. Next, HERAPDMA (amine equivalent weight about 387 g/equivalent) (99.8 g) and 2-propanol (IPA, 27.7 g) were charged into the reaction mixture. An initial pH measurement of the solution resulted in a reading of about 9.7. After heating to about 60° C., epichlorohydrin (26.1 g) was added dropwise via the addition funnel over a period of approximately 10 minutes. At the end of the addition of the epichlorohydrin, the resulting exothermic reaction had caused the temperature to increase to about 71° C. The product became very thick and showed signs of solidifying, so an additional 27.7 g of IPA was charged to the reactor, after which the product was a clear fluid.

A pH measurement at this point resulted in a reading of about 10.4, indicating substantial free amine was still present. The solution was held at about 70° C. for approximately two hours. A sample was titrated with $AgNO_3$ to determine the amount of chloride anion present, and it was determined that about 0.72 milliequivalents per gram (meq/g) of chloride anion were present in the reactor solution, indicating that about 0.09 meq/g of chlorohydrin was still present in the reactor solution. Titration of a second sample in acetic acid with perchloric acid indicated that about 0.022 meq/g of free amine were present in the reactor solution. Heating was removed from the reactor, another 14.5 g of IPA was added to maintain fluidity, and the solution was stirred overnight.

The next day, 50 wt % NaOH (0.8 g) was charged to the reactor solution at 25° C., and the solution was then heated to 70° C. After 2 hours, a sample was again titrated for anionic chloride, with a result of about 0.76 meq/g. Thus, about 94% of the halohydrin had been consumed, so an additional 0.8 g of 50 wt % NaOH was charged to the reactor solution, still at about 70° C. After an additional 2 hours, another titration for anionic chloride indicated essentially complete reaction of the chlorohydrin, with anionic chloride at about 0.81 meq/g. Heating was then discontinued, and the reactor solution was diluted with an additional 19.8 g of deionized water before the product was transferred to a storage bottle. Final analyses of the product are shown in Table 1.

Example 2

Synthesis of a
Sucrose-Epichlorohydrin-HERAPDMA (3:2:3)
Composition

A sucrose-epichlorohydrin-HERAPDMA (3:2:3) composition was prepared in this example, which may be referred to as Composition 2.

The reactor configuration used for Composition 1 was used. HERAPDMA (170.8 g), 37 wt % HCl (4.5 g) and IPA (88.2 g) was charged to the reactor. A solution of sucrose (150.6 g) in deionized water (150.8 g) was then charged to the reactor. The reactor was heated to about 70° C., and epichlorohydrin (43.4 g) was added to the reactor via the addition funnel over approximately 20 minutes. When the epichlorohydrin addition was complete, the pH was about 11.55. Temperature was held at about 70° C. After approximately one hour, the pH was about 10.8. After approximately 2 more hours, perchloric acid titration (PAT) indicated that about 0.0363 meq/g of free amine were present, or about 1.4 wt % HERAPDMA. Titration with $AgNO_3$ indicated the presence of about 0.7 meq/g chloride, or about 100% of the theoretical amount. NaOH 50 wt. % (0.3 g) was added to insure complete chlorohydrin decomposition, and after an additional 15 minutes at about 70° C., the reactor contents were cooled. After dilution with an additional 9.9 g of IPA and 11.0 g of water, the reactor contents were transferred to a storage bottle. Final analyses of the product are shown in Table 1.

Example 3

Synthesis of a
Sucrose-Epichlorohydrin-HERAPDMA (1:2:2)
Composition

A sucrose-epichlorohydrin-HERAPDMA (1:2:2) composition was prepared in this example, which may be referred to as Composition 3.

This composition was prepared using the same process as described above for Composition 2, but with the molar ratio of sucrose:epichlorohydrin:HERAPDMA to be 1:2:2. Final analyses of the product are shown in Table 1.

Example 4

Synthesis of a
Sucrose-Epichlorohydrin-HERAPDMA (1:3:3)
Composition

A sucrose-epichlorohydrin-HERAPDMA (1:3:3) composition was prepared in this example, which may be referred to as Composition 4.

This composition was prepared using the same process as described above for Composition 2, but with the molar ratio of sucrose:epichlorohydrin:HERAPDMA to be 1:3:3. Final analyses of the product are shown in Table 1.

Example 5

Synthesis of a
Sucrose-Epichlorohydrin-HERAPDMA (1:2.5:2.5)
Composition

A sucrose-epichlorohydrin-HERAPDMA (1:2.5:2.5) composition was prepared in this example, which may be referred to as Composition 5.

This composition was prepared using the same process as described above for Composition 2, but with the molar ratio of sucrose:epichlorohydrin:HERAPDMA to be 1:2.5:2.5. Final analyses of the product are shown in Table 1.

Example 6

Synthesis of a
Sucrose-Epichlorohydrin-HERAPDMA (1:2.3:1.5)
Composition

A sucrose-epichlorohydrin-HERAPDMA (1:2.3:1.5) composition was prepared in this example, which may be referred to as Composition 6.

A 70 wt % solution of sucrose in deionized water (72.9 g) was charged to a 500 ml glass 5-necked reactor with nitrogen blanket, mechanical stirring, reflux condenser, addition funnel, pH probe, thermocouple and a heating mantle with automatic temperature control. HERAPDMA (72.9 g) and IPA (48.03 g) were charged to the reactor. HERBAPP (15 g) was charged to the reactor to serve as an alkoxylation catalyst. The contents in the reactor were heated to about 70° C. Epichlorohydrin (29.4 g) was then added dropwise via the addition funnel over a period of approximately thirty minutes, during which time an exothermic reaction was observed, and heating was removed by an air cooling applied to maintain the reactor contents at about 65° C. to about 80° C. Once the epichlorohydrin addition was completed, the reactor was held at about 70° C. for approximately 6 hours, after which time titration indicated about 84 molar % conversion of HERAPDMA to quaternary ammonium groups.

The solution was left standing overnight at ambient temperature, then was reheated slowly to about 70° C. the next morning because the mixture had formed a thick gel. After approximately 4 hours at about 70° C., then approximately one hour at about 80° C., titration indicated about 87 molar % conversion of HERAPDMA to quaternary amines. After adding an additional 42 g of IPA, the solution was again left standing overnight at ambient temperature. The solution was then heated to about 70° C. the next morning, and epichlorohydrin (2.0 g) was added to the reactor solution. The solution was held at about 70° C. for approximately two hours, after which time the solution temperature was reduced to about 50° C., and 50% NaOH (3.0 g) was added to the reactor. The solution pH immediately rose from about 9.8 to about 11.5 and stayed there for approximately one hour. 37 wt. % HCl (5 g) was then added to the reactor in small portions until the pH was about 7. The product was then poured into a storage bottle. Final analyses of the product are shown in Table 1.

Example 7

Synthesis of a
Sucrose-Epichlorohydrin-HERAPDMA (1:2:1)
Composition

A sucrose-epichlorohydrin-HERAPDMA (1:2:1) composition was prepared in this example, which may be referred to as Composition 7.

The same reactor configuration as in Composition 6 was used. Initial reactant charge was HERAPDMA (185.4 g), 70 wt. % sucrose in deionized water (233.55 g), and IPA (28.1 g). Epichlorohydrin (44.1 g) was added via the addition funnel over approximately one hour, starting at about 70° C. During the first few minutes of the epichlorohydrin addition, a strong exotherm was observed, and the temperature rose to about 76° C. with air cooling. The solution became very viscous, so additional solvent—a 1:1 (wt.) mixture of IPA and deionized water (80 g total)—was added. After completing the epichlorohydrin addition, still at about 70° C., the solution was a clear viscous yellow fluid. Deionized water (100 g) and IPA (40 g) were added to obtain a less viscous solution, and this solution was held at about 70° C. for approximately one hour after which time titration with AgNO$_3$ indicated that about 89 molar % of the halohydrins had been converted to chloride.

A second charge of epichlorohydrin (44.6 g) was then started, again dropwise via the addition funnel. At the end of the second epichlorohydrin charge, the pH of the reactor solution was about 10.14, and approximately 30 minutes later the pH was about 9.41 and continuing to drop. After approximately one hour, still at about 70° C., the pH was about 9.2, and the chloride was about 50% of the theoretical amount based on the total epihalohydrin charge and about 98% based on theoretical quaternary ammonium chloride content. NaOH 50 wt. % (37.89 g) was then added to the reactor solution at about 60° C., dropwise via the addition funnel, after which the solution pH was about 11.2. During the next hour the temperature was held at about 60° C., and the pH dropped to about 9.9. Heating was turned off for the night, and the solution was left stirring at ambient temperature. A sample was titrated with AgNO$_3$ and it was found that about 87 molar % conversion of halohydrins to chloride had been attained.

The next morning, the solution was resampled, and chloride conversion had increased to 92 mole % overnight. The solution was warmed to about 60° C. and held there for approximately one hour, then titrated again for chloride conversion, which was then found to be about 100 mole % of the theoretical amount based on the total epichlorohydrin charge. Hydrochloric acid 20 wt. % (12.3 g) was added to the reactor to attain a pH of about 5.5, then the solution was cooled before pouring into a storage bottle. Final analyses of the product are shown in Table 1.

Example 8

Synthesis of a
Sucrose-Epichlorohydrin-C-65APDMA (1:3:3)
Composition

A sucrose-epichlorohydrin-C-65APDMA (1:3:3) composition was prepared in this example, which may be referred to as Composition 8.

The reactor configuration was a 500 ml glass 5-necked reactor with nitrogen blanket, mechanical stirring, reflux condenser, addition funnel, pH probe, thermocouple and a heating mantle with automatic temperature control. C-65AP-DMA (53 g) was charged to the reactor with IPA (113.8 g). HCl 37 wt. % (6 g) was then charged to attain solution pH of about 6.9 at about 35° C. Finely powdered sucrose (37.4 g) was charged and the temperature was increased to about 50° C. Epichlorohydrin (15.2 g) was added dropwise via the addition funnel over approximately 15 minutes. The pH of the reaction mixture was increased from the initial pH of about 6.9 to about 7.1 when the epichlorohydrin addition was completed. Temperature was increased to about 70° C., and pH began to increase. Several drops of 20% HCl was added during the next hour to maintain pH between about 7.0 to about 8.5.

At this point the mixture was hazy and apparently contained undissolved sucrose. Deionized water (15 g) was charged to the reactor and the solution cleared almost completely. The temperature was maintained at about 70° C. for approximately another hour. And then, C65-APDMA (53 g) was charged to the reactor. As the amine was added, the solution pH rose from about 7 to about 8.5, while the temperature was maintained at about 70° C. Once the amine addition was completed, the pH immediately began to decrease, and after approximately 15 minutes the pH was about 8. After approximately 45 minutes at about 70° C., the pH was steady at about 8. HCl 20 wt. % (several drops) was charged to the reactor to adjust the pH to about 7.

To this stage of the process, a total of about 12 g of HCl 20 wt. % had been charged including the initial charge and the pH adjustments. After maintaining the reaction temperature at about 70° C. for approximately 30 minutes to verify the stability of the pH, epichlorohydrin (15.2 g) was added via the addition funnel over approximately 15 minutes. During the addition of the epichlorohydrin, an additional 3.6 g of HCl 20 wt. % was added to maintain a pH of about 7. The total amount of 20% HCl added during epichlorohydrin addition was about 15.6 g. The temperature was maintained at about 70° C. after epichlorohydrin addition, and HCl 37 wt. % (5.3 g) was added over the next hour as needed to maintain the solution pH of about 7. After approximately one hour, the pH had become stable at about 7, and the temperature was maintained at about 70° C. for an additional 30 minutes to verify stability. The reactor temperature was then adjusted to about 60° C. in preparation for addition of KOH.

Once the temperature was steady at about 60° C., KOH 87 wt. % pellets (2.4 g) was added to the reactor and the pH increased to just over about 9 before returning to about 7 almost immediately. KOH 87 wt. % pellets (4.3 g) were charged to the reactor. The solution was becoming hazy, presumably from KCl formation through dehydrohalogenation reactions. Deionized water (45.7 g) was charged to the reactor and the solution became clear again. The pH at this point was about 8.4. KOH 35 wt. % solution (21.2 g) was charged to the reactor to attain a stable pH of about 11. The reactor contents were cooled to 40° C., and the pH was about 11.4. Because the solution was again becoming hazy with KCl, deionized water (25 g) was added to again attain a clear solution. With the pH stable at over about 11, KOH consumption through dehydrohalogenation reactions had slowed. HCl 37 wt. % (0.5 g) was charged to adjust pH to under about 11. The solution was left stirring at ambient temperature for two days at a pH of about 10.5. The solution was then warmed to about 50° C. and the solution pH was about 10.7. Additional KOH 87 wt. % (1.7 g) was charged to the reactor, and the pH was still around 10.5 after stabilizing. Over the next five hours, HCl 37 wt. % (10 g) was charged gradually to the reactor until a stable solution pH was attained at a pH of about 5.5. Deionized water (35 g) was then added to clear the slight haze that had again formed.

The product was poured into a storage bottle. Final analyses of the product are shown in Table 1.

Example 9

Synthesis of a Carpol GSP-355-Epichlorohydrin-HERAPDMA Composition

A Carpol GSP-355-epichlorohydrin-HERAPDMA composition was prepared in this example, which may referred to as Composition 9.

Carpol GSP-355, available from Carpenter Co., Richmond, Va., is a mixture of sucrose and glycerol that has been propoxylated to a hydroxyl equivalent weight of about 156 as determined by hydroxy number. It is a clear neat liquid, so no water is required in this reaction, unlike the reaction with sucrose. The ratio of equivalents used for this CCE composition was 1:1:1 for hydroxyl equivalents from Carpol GSP-355, moles of epichlorohydrin, and moles of HERAPDMA.

The reactor configuration was a 500 ml glass 5-necked reactor with nitrogen blanket, mechanical stirring, reflux condenser, addition funnel, thermocouple and a heating mantle with automatic temperature control. Carpol GSP-355 (73.6 g) and HERAPDMA (182.7 g) were charged to the reactor and heated to about 60° C. Epichlorohydrin (43.7 g) was charged via the addition funnel over approximately 30 minutes. The reactor temperature was increased to about 70° C. When about half of the epichlorohydrin was charged, an exothermic reaction increased the reactor temperature to about 90° C. even as air cooling was applied. The exothermic reaction subsided approximately 15 minutes after completion of the epichlorohydrin charge. The reactor contents were then maintained at about 80° C.

After approximately 30 minutes, the solution was becoming very viscous and was starting to climb the stirrer shaft. Isopropyl alcohol (IPA, 60 g) was added to reduce the solution viscosity. After approximately two hours at about 80° C., titration for cationic surfactant with SLS indicated that about 91 mole % of the amine was converted to quaternary ammonium compounds, and about 99 mole % of chloromethyl groups had been converted to chloride anion form. An additional about 5 g of epichlorohydrin was charged and the solution held at about 80° C. for approximately three hours. The reactor was then cooled, and the product transferred to a storage bottle. Final analyses of the product are shown in Table 1.

Example 10

Synthesis of an Epi-Alkoxylated Hydrolyzed Sucrose Composition

An epi-alkoxylated hydrolyzed sucrose composition was prepared in this example, which may be referred to as Composition 10.

The reactor configuration was a 500 ml glass 4-necked reactor with nitrogen blanket, mechanical stirring, reflux condenser, addition funnel, thermocouple and a heating mantle with automatic temperature control. Deionized water (16.7 g) was charged to the reactor and heated to near boiling. Sucrose (66.8 g) was added gradually over about 1 hour. The temperature was then reduced to about 50° C. Most of the sucrose was dissolved after approximately an hour, but there was still some undissolved sucrose. Three drops of glacial acetic acid was added to the solution, which was then left stirring overnight (approximately 15 hours) at about 50° C. to effect hydrolysis of sucrose into glucose and fructose.

A Lewis acid catalyst, $BF_3$-acetic acid complex (1.8 g) was then charged to the reactor. The solution temperature was then increased to about 65° C. Epichlorohydrin (314.5 g) was added dropwise via the addition funnel over a two-hour period. Once the epichlorohydrin addition started, the heating mantle was removed, and the temperature was maintained at from about 65° C. to about 75° C. by regulating the rate of epichlorohydrin addition, since the reaction was highly exothermic. Occasionally, a stream of air was applied to the reactor wall to cool the contents. Once the epichlorohydrin charge was completed, the heating mantle was replaced and the reactor was held at about 65° C. for approximately two hours, after which time 13C and 1H NMR analyses indicated the absence of epichlorohydrin in the product.

The viscous dark liquid appeared to contain no undissolved solids. The molar ratio of epichlorohydrin to sucrose to water was about 17.5:1:4.75. After conversion of the sucrose to glucose and fructose, these molar ratios of were sufficient to convert all of the water to bis-3-chloro-2-hydroxypropyl ether and to form a 3-chloro-2-hydroxypropyl ether with every hydroxyl on both the glucose and the fructose (including the glycosidic hydroxyls). The 13C NMR spectrum of a sample of the product in deuterated acetonitrile exhibited at least 13 distinct signal peaks from 46 to about 47 ppm, in the region where halohydrin chloromethyl groups are typically found, and about 6 distinct signal peaks from about 43 to 44 ppm, in the region where the non-halohydrin chloromethyl groups are expected. Titration of a sample with $AgNO_3$ solution detected no chloride anion. Thus, the composition comprises a highly chloromethyl-substituted carbohydrate mixture.

The product was transferred to a storage bottle. Composition 10 can be called "epi-alkoxylated carbohydrate," and is mixture of glucose and fructose that have been highly substituted with ether and chloromethyl groups, with both halohydrin functionality and alkyl halide functionality. In can be used to prepare CCEs of the present technology, for example, by reaction of tertiary amines with the organochlorine groups to form quaternary ammonium compounds.

Example 11

Synthesis of a Sucrose-Epichlorohydrin-HERAPDMA (1:2.5:2.5) Composition

A sucrose-epichlorohydrin-HERAPDMA (1:2.5:2.5) composition was prepared in this example, which may be referred to as Composition 11.

This composition was prepared using the same process as described above for Composition 2, but with the molar ratio of sucrose:epichlorohydrin:HERAPDMA to be 1:2.5:2.5. Final analyses of the product are shown in Table 1.

Example 12

Synthesis of a Sucrose-Epichlorohydrin-SoyAPDMA/BAPDMA (1:4:3.2) Composition

A sucrose-epichlorohydrin-HERAPDMA (1:4:3.2) composition was prepared in this example, which may be referred to as Composition 12.

The reactor configuration was a 1000 ml glass 5-necked reactor with nitrogen blanket, mechanical stirring, reflux condenser, addition funnel, pH probe, thermocouple and a heating mantle with automatic temperature control. Sucrose 70 wt. % in deionized water (339.8 g) was charged to the reactor with 1,4-dimethylpiperazine (12 g). The temperature was increased to 80° C. Epichlorohydrin (257.2 g) was added dropwise via the addition funnel over approximately 90 minutes. When about half of the epichlorohydrin charge was in the reactor, an additional 2.5 g of 1,4-dimethylpiperazine as added to the reactor, and then an additional 2 g was added when the epichlorohydrin charge was completed. The pH of the reaction mixture was about 8, so another 4.5 g of 1,4-dimethylpiperazine was added to the reactor. The temperature was increased to about 90° C. and that temperature was maintained for about three hours and the solution was still hazy. A portion of this solution (119.4 g) was transferred to a 500 ml reactor equipped identically to the 1000 ml reactor used in the first step. Behenamidopropyldimethylamine (BAPDMA, 120.6 g) was charged to the reactor with isopropyl alcohol (71 g), which was then heated to about 70° C. After about two hours, the conversion of amine to quaternary ammonium compounds was about 100 mole % complete, and the chloride content indicated about 100 mole % conversion of organochlorine compounds to chloride. The product was a soft paste when cooled.

The product was poured into a storage bottle. Final analyses of the product are shown in Table 1.

TABLE 1

| Composition | Cationic Actives (meq/g) | Non-volatile Material (NVM) (wt %) | Ratio Sucrose:Epi:Amine |
|---|---|---|---|
| 1 | 0.67 | 62.3 | 1:1.1:1 |
| 2 | 0.63 | 59.0 | 3:2:3 |
| 3 | 0.81 | 57.9 | 1:2:2 |
| 4 | 0.98 | 60.5 | 1:3:3 |
| 5 | 0.92 | 59.1 | 1:2.5:2.5 |
| 6 | 0.75 | 59.5 | 1:2.3:1.5 |
| 7 | 0.51 | 55.9 | 1:2:1 |

TABLE 1-continued

| Composition | Cationic Actives (meq/g) | Non-volatile Material (NVM) (wt %) | Ratio Sucrose:Epi:Amine |
|---|---|---|---|
| 8 | 0.61 | 41.2 | 1:3:3 |
| 9 | 1.2 | 83.1 | * |
| 11 | 0.92 | 59.1 | 1:2.5:2.5 |
| 12 | 1.0 | 71.9 | 1:4:3.2 |

* For composition 9, the ratio for carbohydrate hydroxyl equivalents, moles of epichlorohydrin, and moles of HERAPDMA was 1:1:1. Essentially, a mole of epichlorohydrin and HERAPDMA was used for every sucrose hydroxyl (8 total) and for every glycerol hydroxyl.

Example 13

Rheology Studies of Compositions 1, 3, 4, 7, 11 and 12

The compositions prepared in the preceding examples exhibit a surprising breadth of solubility properties and thickening properties. Some can form gels in water without additives, while others dissolve e in water without noticeable thickening, but thicken the solutions or form viscoelastic gels after different amounts of salts are added. Certain compositions are soluble and thicken in extremely high salt concentration brines. This example prepared various CCE solutions and gels using Compositions 1, 3, 4, 7, 11, and 12 prepared above, and studied some of their properties.

The primary salt used in the gel solutions was potassium chloride (KCl). Solutions of each composition were prepared to contain the specified milliequivalents per gram (meq/g) of cationic quaternary ammonium compounds and the specified wt. % of KCl, unless an alternate salt was used. One solution was prepared from a stock solution of calcium chloride. The calcium chloride stock solution was prepared from calcium chloride di-hydrate crystals such that the final composition comprised about 7 wt. % $CaCl_2$ and about 93 wt. % water. Deionized water was the other component of the solutions.

A stock solution of 25 wt. % KCl in deionized water was used for the KCl source. The CCE composition was weighed into a small Waring blender cup, sufficient 25% by weight KCl was weighed into the cup to provide the specified weight of KCl, and the remainder of the mass was made up with deionized water to reach the final composition. The cup was then covered and mixed on a heavy duty commercial Waring blender base for about three to five minutes. The solutions, or rather foams, contained a large volume of entrapped air, so they were transferred to centrifuge bottles and centrifuged at about 3000 rpm. Generally, thirty minutes time of centrifugation was sufficient to remove most of the air bubbles, so that a bubble-free sample could be removed for viscosity tests.

Viscosity measurements were made using an AR 2000 Advanced Rheometer made by TA Instruments. The geometry used was a DIN concentric cylinder and bob, and 20 ml sample was used for each test. FIGS. 3-15, 17, and 18 show graphs for stepped shear experiments of a variety of viscoelastic solutions made from Composition 1, 3, 4, 7, 11 or 12. The experiments were conducted at three temperatures—50° C., 70° C. and 90° C. FIG. 16 shows graphs for continuous shear ramp experiments at 70 and 90° C. for a viscoelastic solution made from Composition 1.

Composition 1 was used to prepare solutions with 7%, 10%, 15%, 20% and 25% (all by weight) KCl. The concentration in all cases was 0.006 meq/g of quaternary ammonium compounds. The flow curves are shown in FIGS. 3 through 6. The solution with 7% KCl was slightly thickened, but was not viscoelastic. The solution with 10% KCl was slightly more viscous, and exhibited relatively Newtonian flow behavior. The 15% KCl solution exhibited viscoelasticity as evidenced by bubble recoil in a stirred solution. Its viscosity showed little shear dependence from shear rates of 0.1 to 100 sec$^{-1}$. At the shear rate of 100 sec$^{-1}$ viscoelastic gels viscosities ranged from about 0.06 Pa·s at 90° C. to about 0.3 Pa·s. At 20% KCl, the 90° C. was relatively constant, about 0.1 Pa·s, across the shear rate range, a substantial increase from the 90° C. viscosity of the 10% KCl solution. At both 70° C. and 50° C., the viscosity of the 20% KCl solution increased over the comparable viscosity for the 15% KCl solution. At 25% KCl, the 90° C. viscosity changed little from that of the comparable 20% KCl flow curve, but at both 50° C. and 70° C., the viscosity had decreased from those of the 20% KCl solution, and were approaching the comparable curves of the 15% solution. Thus, Composition 1 exhibited good solubility up to about the solubility saturation point of KCl, and exhibited good viscoelastic properties at 15% KCl and higher.

Figure 7:
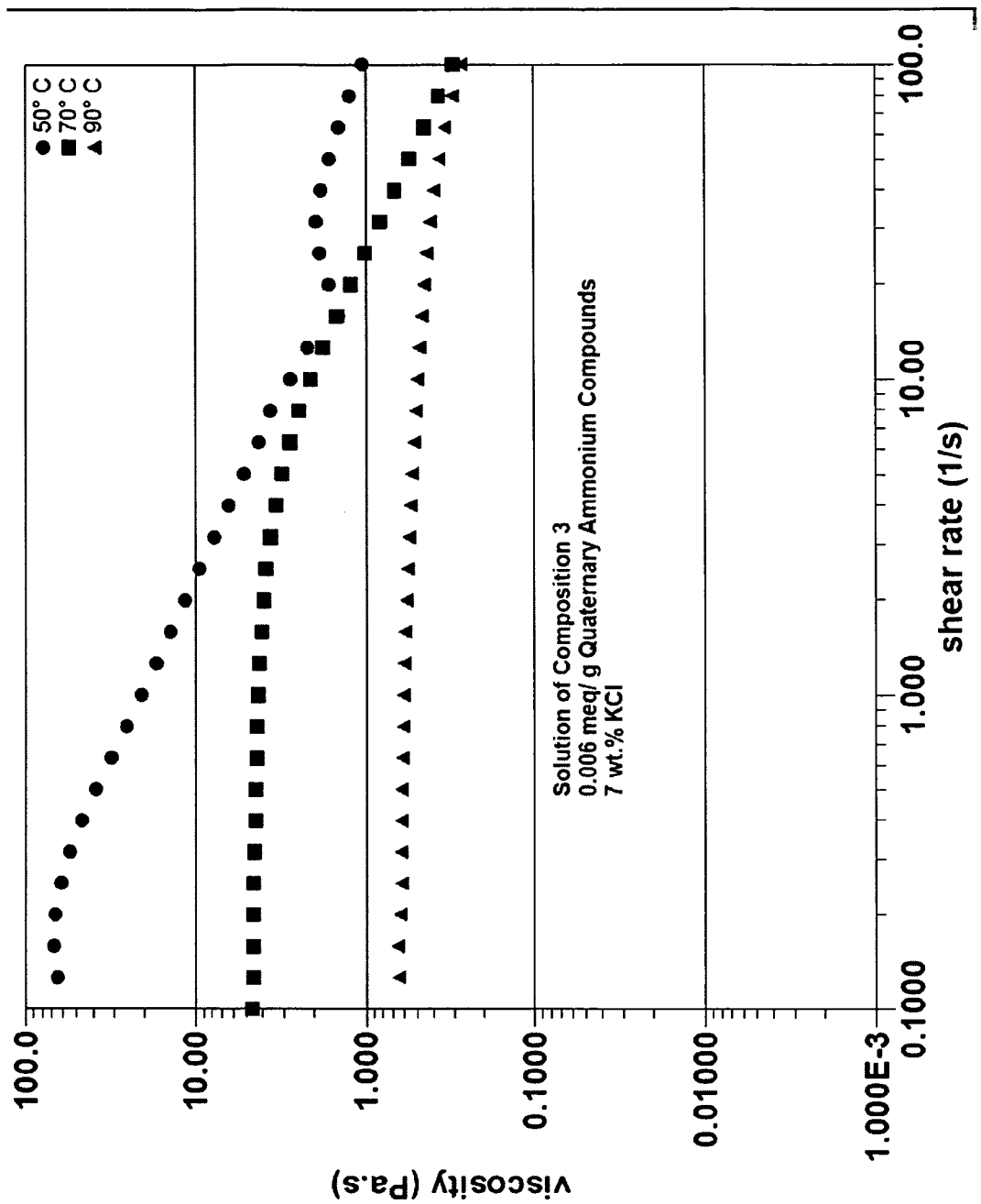
Figure 8:
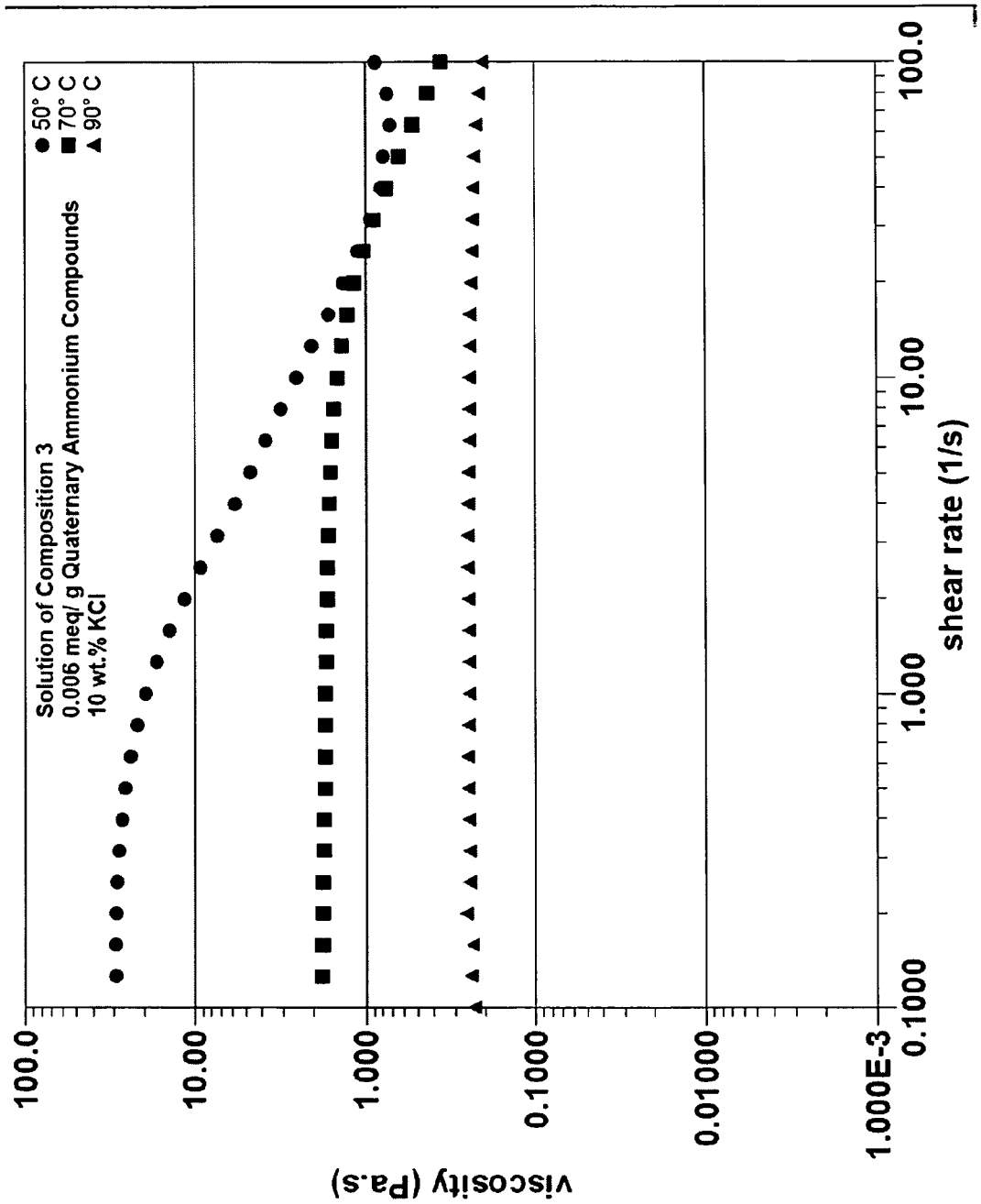

FIGS. 7 and 8 are graphs for solutions prepared using Composition 3. As with all of the solution flow curves, the concentration of quaternary ammonium compound(s) was 0.006 meq/g. Composition 3 was made with about twice the hydrophobic component (HERAPDMA) relative to the sugar, and also about twice the epichlorohydrin. The effect of the change of formulation on solubility was dramatic, as Composition 3 exhibited only partial solubility in 15% KCl. However, at both 7% and 10% KCl, Composition 3 formed excellent clear viscoelastic gels, with the viscosity at 90° C. well exceeding the 0.1 Pa·s threshold.

Figure 9:
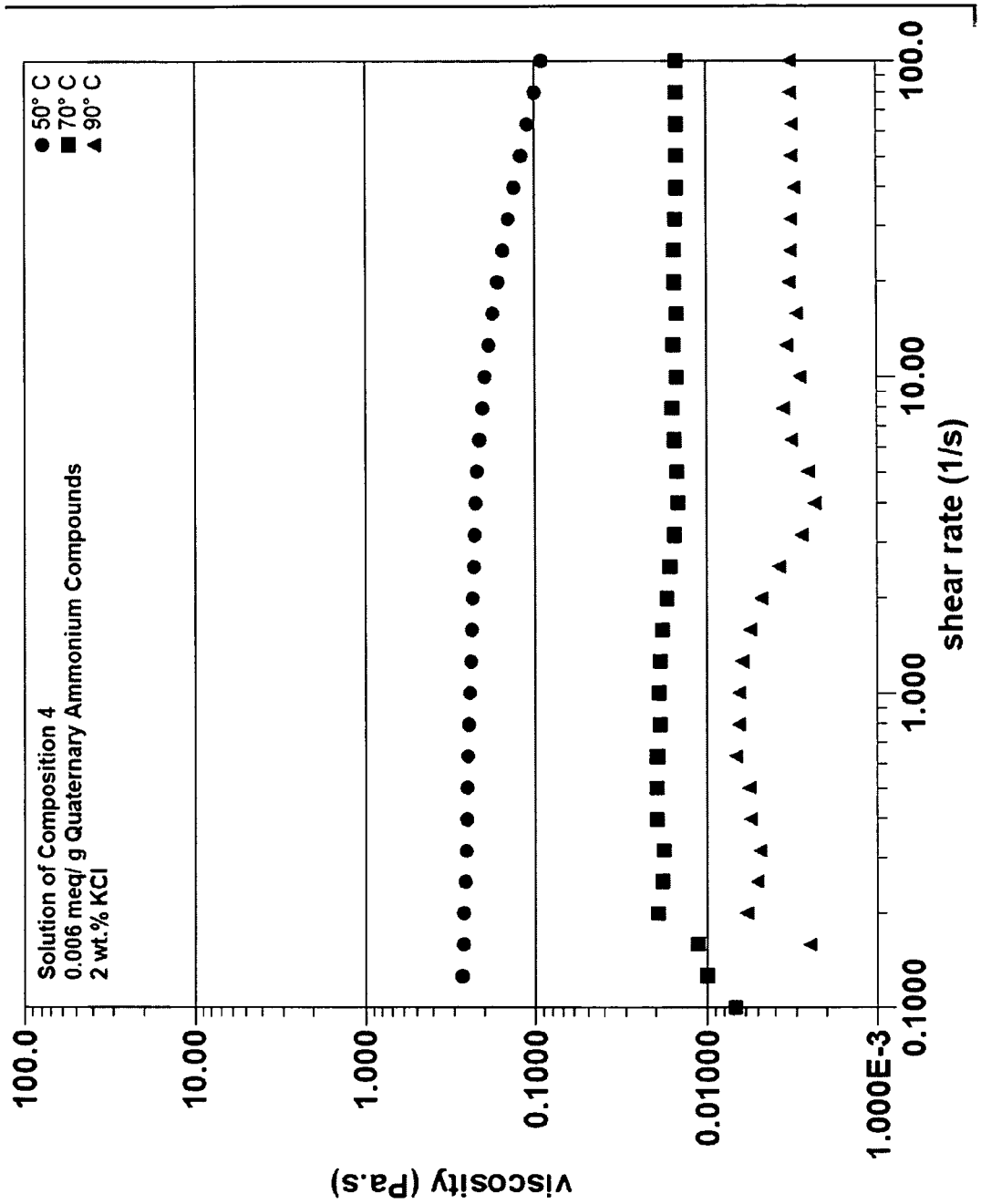
Figure 10:
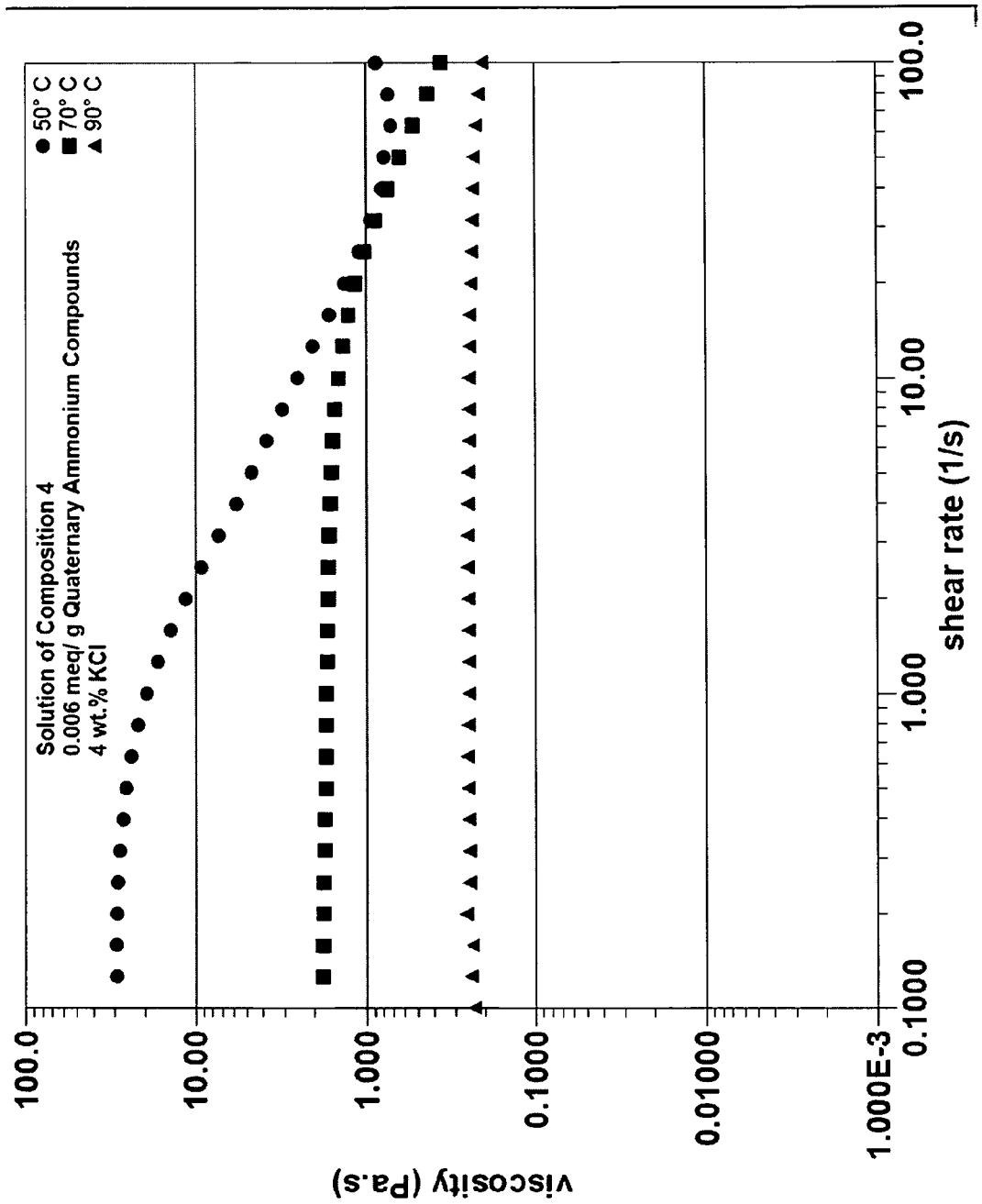
Figure 11:
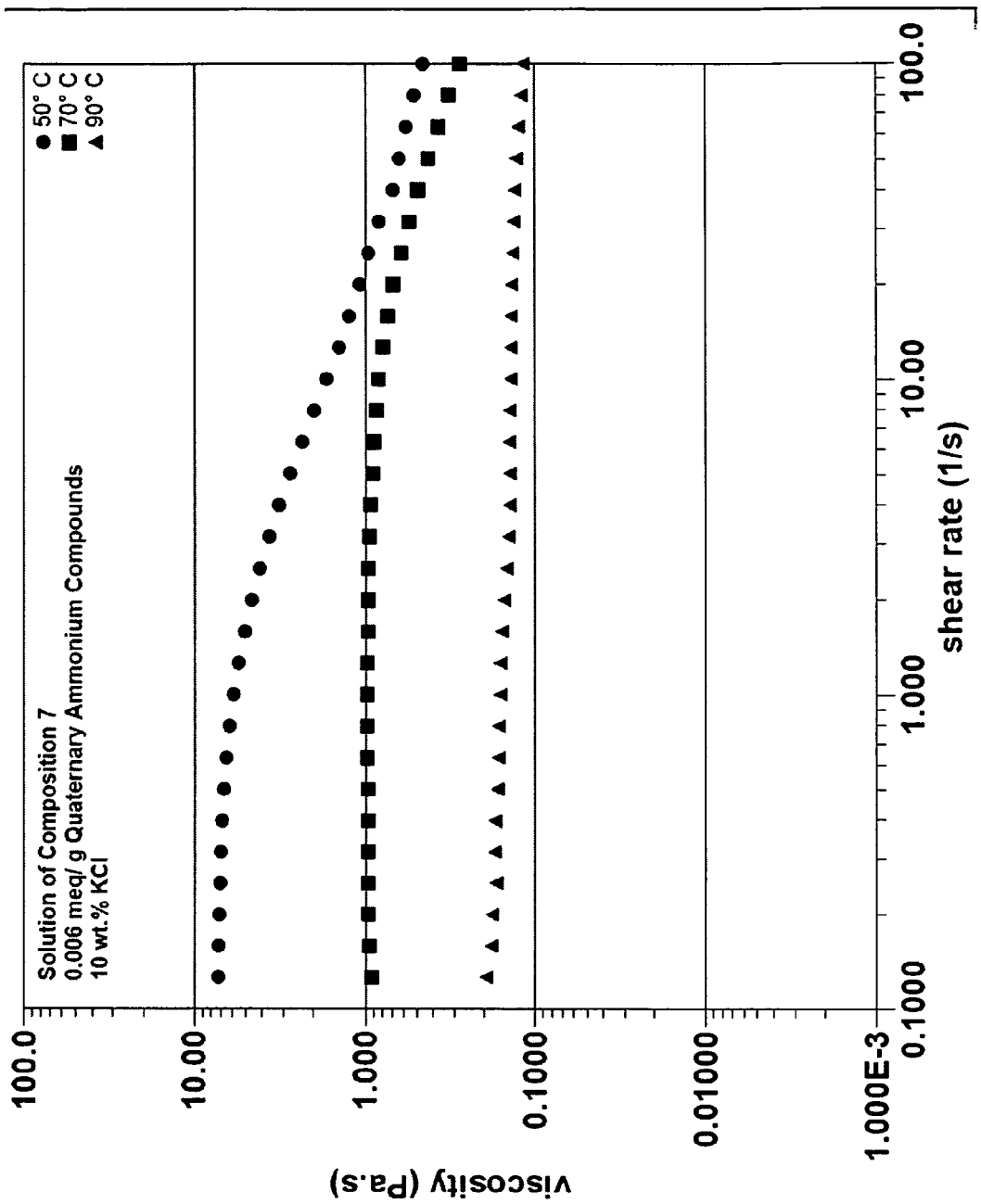
Figure 12:
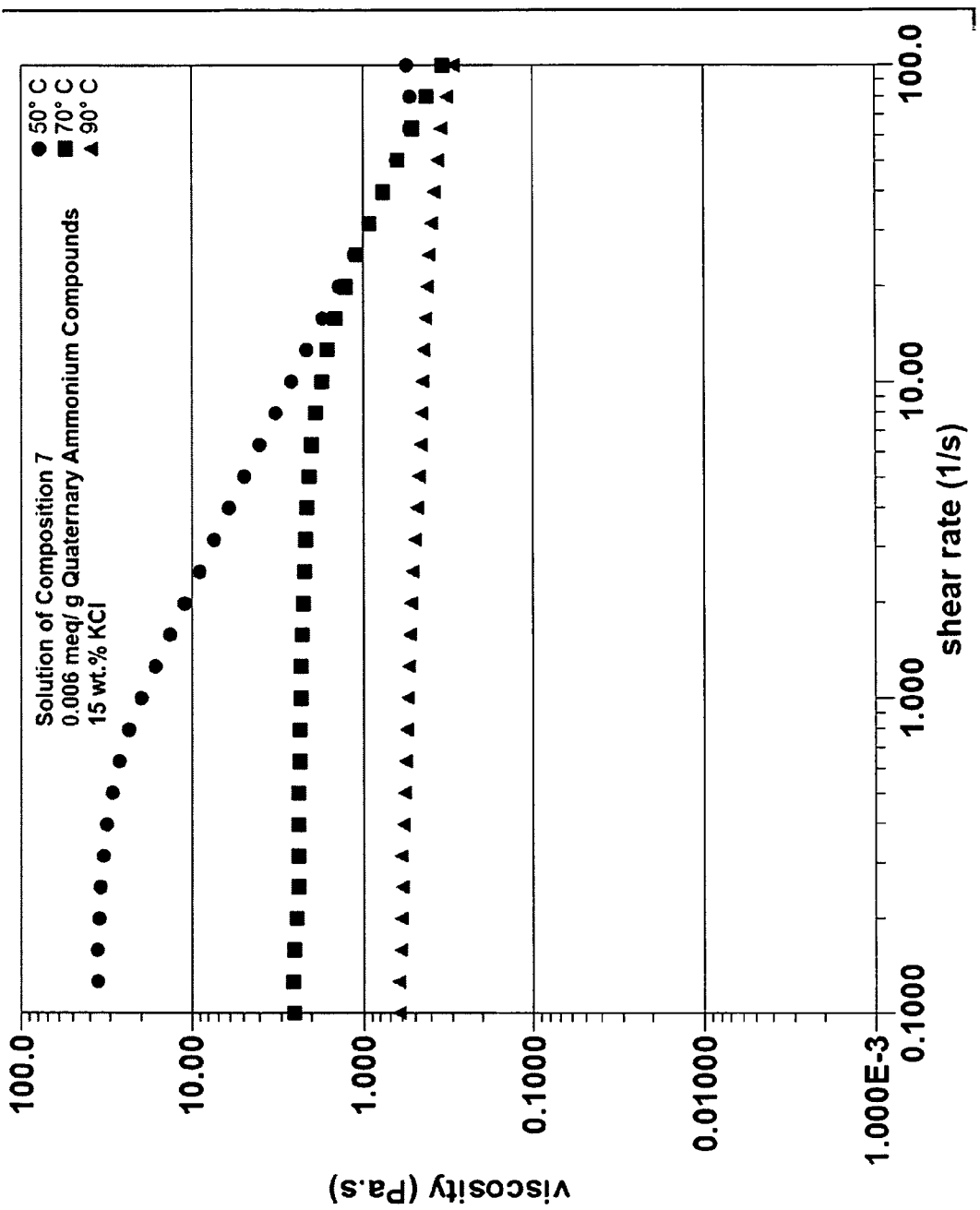
Figure 13:
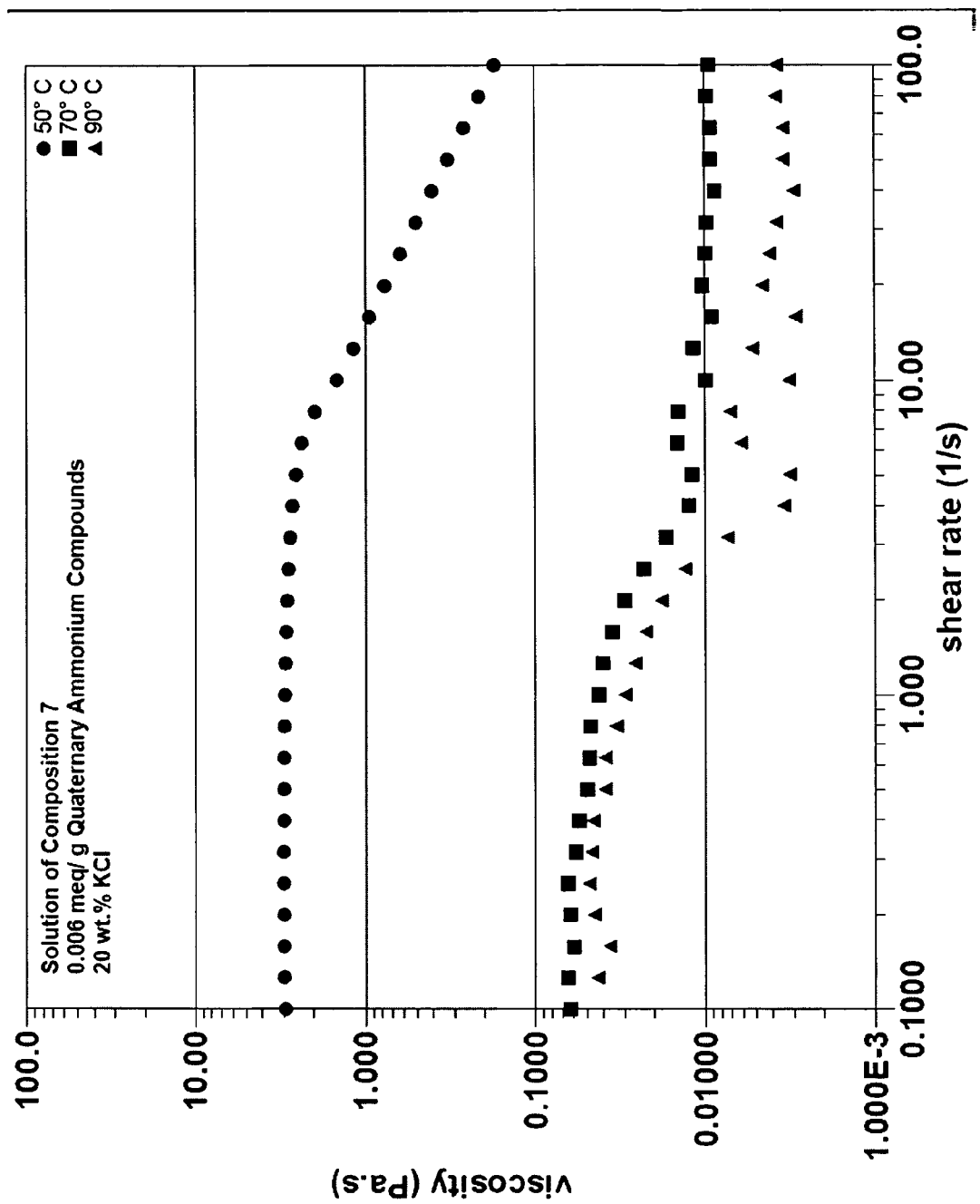
Figure 14:
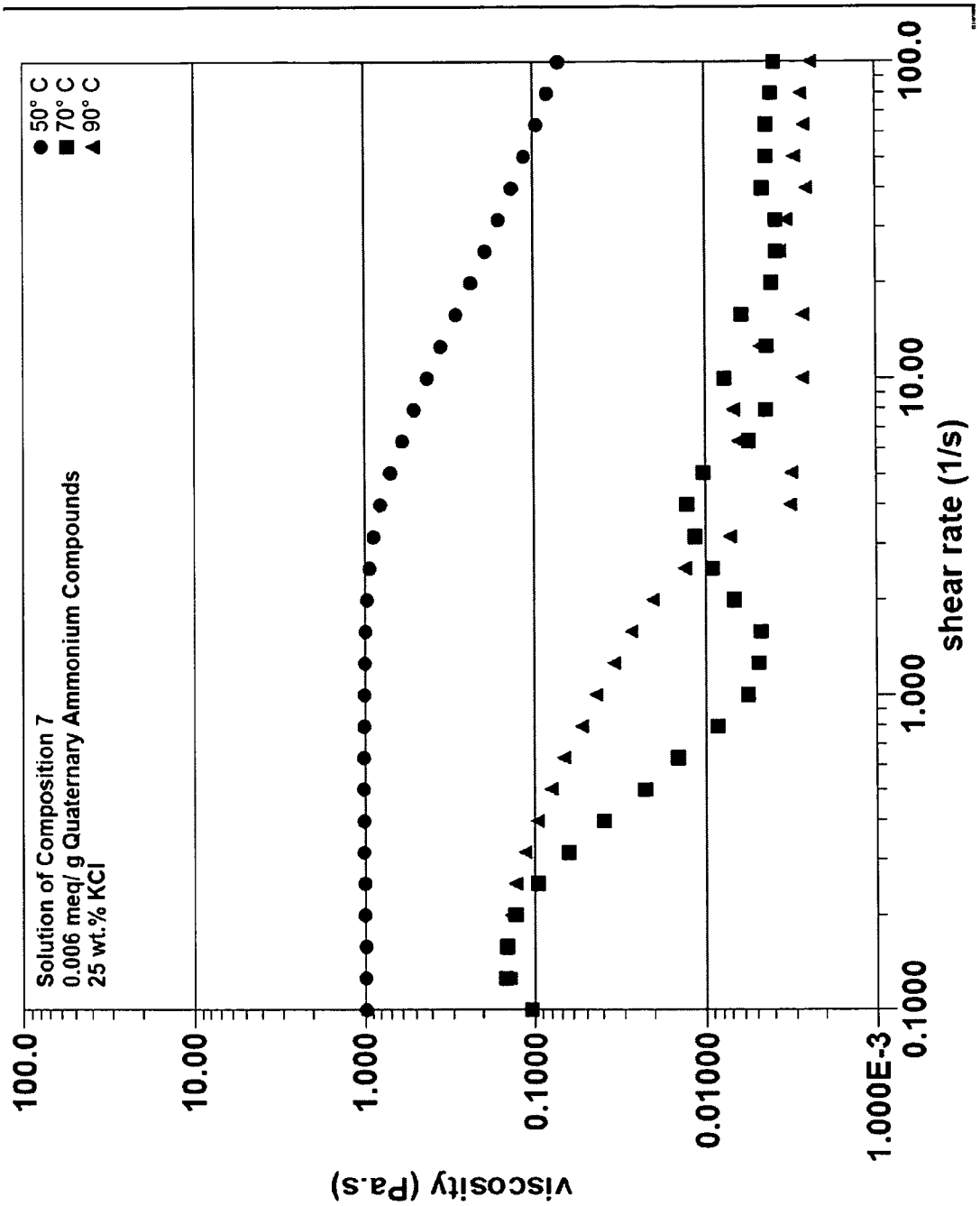

FIGS. 9 and 10 illustrate flow curves for solutions prepared using Composition 4. The molar ratio of epichlorohydrin and hydrophobic HERAPDMA to sugar is now about triple that used in Composition 1. The impact of the change of formulation on solubility is pronounced—Composition 4 exhibited only partial solubility in 5% KCl, yet formed an excellent viscoelastic gel at 4% KCl. When the KCl was decreased to 2%, the solution was viscoelastic from room temperature up to about 50° C., but as the flow curve shows, the gels broke above 50° C. and the solutions were near water-thin at 90° C.

FIGS. 11 through 14 show flow curves for solutions made from Composition 7 with 10%, 15%, 20% and 25% KCl (all by weight). The ratio of hydrophobic component (HERAPDMA) to sugar in this composition was the same as in Composition 1, but the amount of epichlorohydrin had doubled in the formulation. The increased epichlorohydrin is expected to increase carbohydrate-to-carbohydrate ether links, and thus increase average molecular weight of the components. The effect of the formulation change on viscosity is substantial, as shown in the flow curves. While Composition 1 was not viscoelastic in solution with 10% KCl, Composition 7 formed an excellent viscoelastic gel at 10% KCl. In 15% KCl, the viscosity of the Composition 7 solution was about an order of magnitude greater than that of the Composition 1 solution at the same level of KCl. However, at 20% KCl, where Composition 1 exhibited its maximum viscosities, the gels with Composition 7 broke above about 50° C. and the viscosity fell below the 0.1 Pa·s threshold. The results also show that in a 25% KCl solution, the gel performance for Composition 7 worsened.

Figure 15:
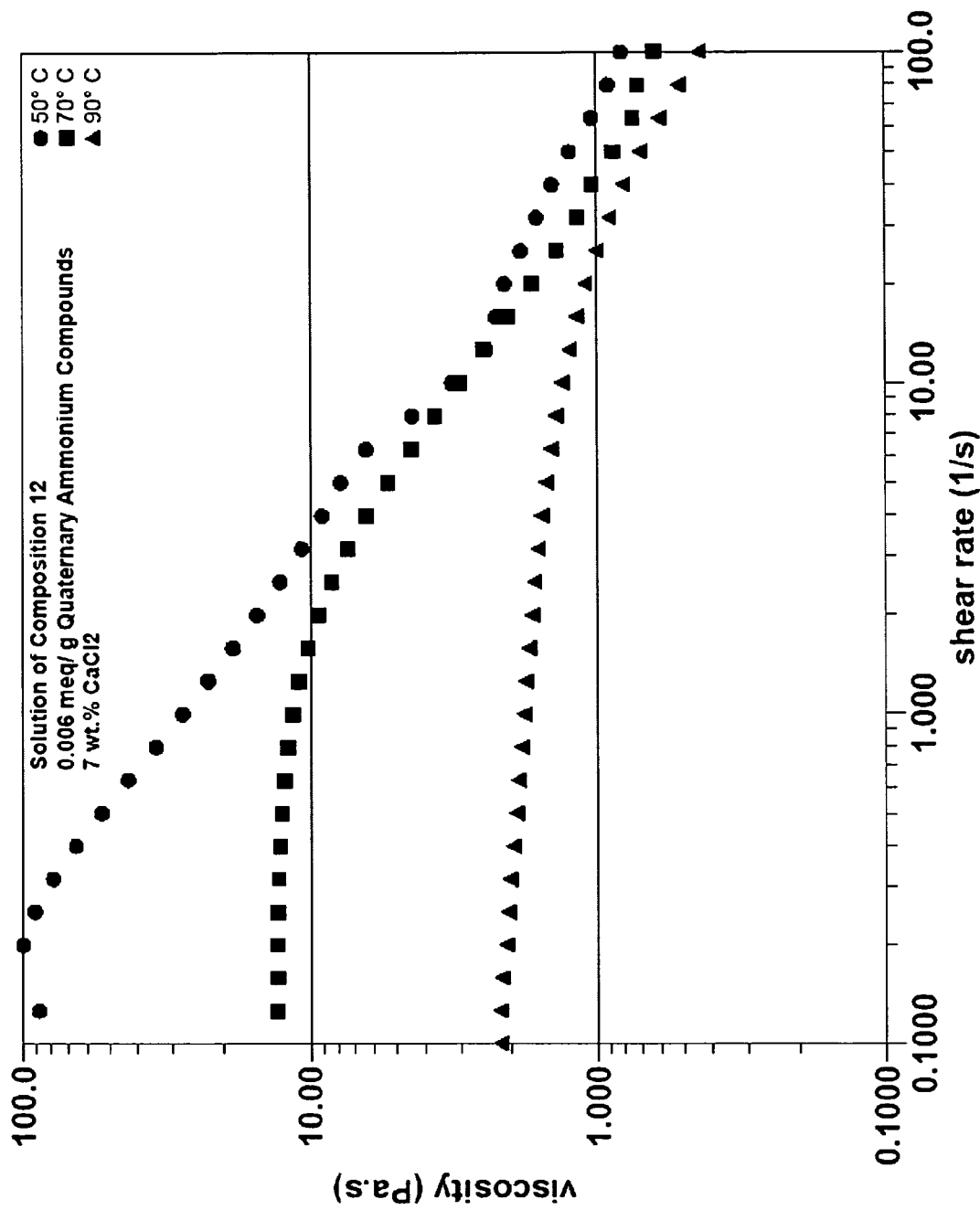
Figure 16:
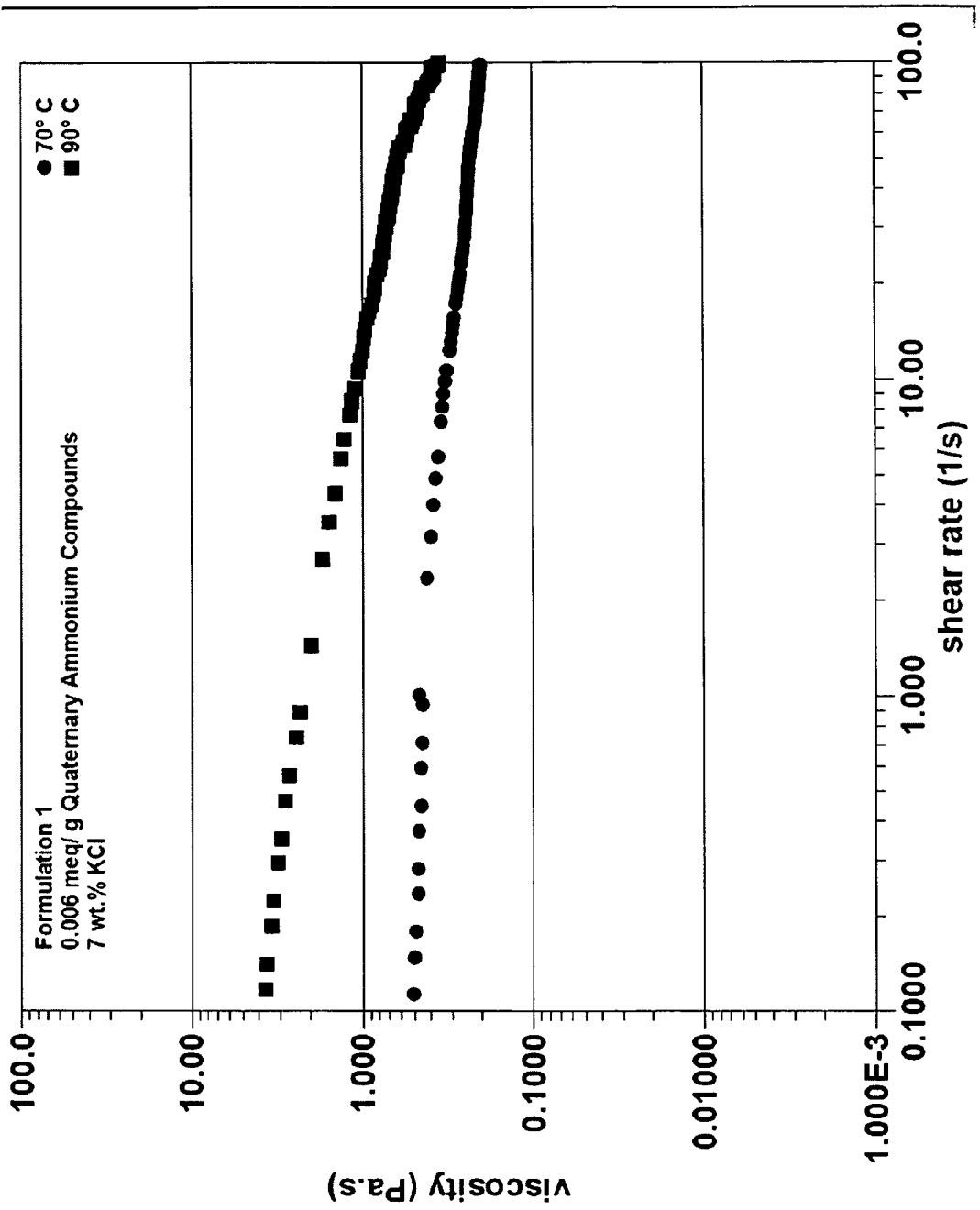
FIG. 16 shows graphs for continuous shear ramp experiments at 70 and 90° C. for a CCE formulation (Formulation 1) made from the CCE composition prepared in Example 1 and a Gemini quaternary ammonium compound.

FIG. 15 shows flow curves for a solution made from Composition 12 with 7 wt. % CaCl$_2$. FIG. 15 demonstrates the ability of a CCE composition of the present technology to form viscoelastic solutions with a divalent metal salt, CaCl$_2$. What is notable about the viscosity profile of the solution made from Composition 12 includes: (1) the solution demonstrates less temperature sensitivity of viscosity at a shear rate of 100 sec$^{-1}$ across a relatively large temperature range, e.g., from about 50° C. to about 90° C.; and (2) the viscosity at the threshold shear rate (100 sec$^{-1}$) is almost an order of magnitude greater than the minimum requirement (0.1 Pa·s).

FIG. 16 demonstrates the benefit of a formulation (Formulation 1) using both a CCE of the present technology and a Gemini quaternary compound as described in U.S. Provisional App. Ser. Nos. 60/734,465 and 60/736,562, and the co-pending utility patent applications claiming priority to U.S. Provisional App. Ser. No. 60/734,465. The Gemini quat used in this example was made from SoyAPDMA and epichlorohydrin. A solution was prepared in 7% KCl to contain 0.003 meq/g of the SoyAPDMA-GQ and 0.003 meq/g of the CCE of Composition 1. Thus, as with the other solutions, the concentration of quaternary ammonium compounds was 0.006 meq/g. The flow curves in FIG. 16 are for measurements at 70° C. and 90° C. Measurements at 50° C. could not be obtained, because the gel climbed the shaft of the bob on the rheometer geometry. The benefit of this formulation is substantial, since neither component alone can form a viscoelastic gel in a 7% KCl solution (the SoyAPDMA-GQ when used alone is not even soluble above about 3% KCl). However, the combination of the two quaternary compositions exhibit gel performance substantially above the 0.1 Pa·s threshold at 90° C. Thus, at temperature of 90° C. and below, less gellant is required to maintain viscosity above the threshold.

Figure 17:
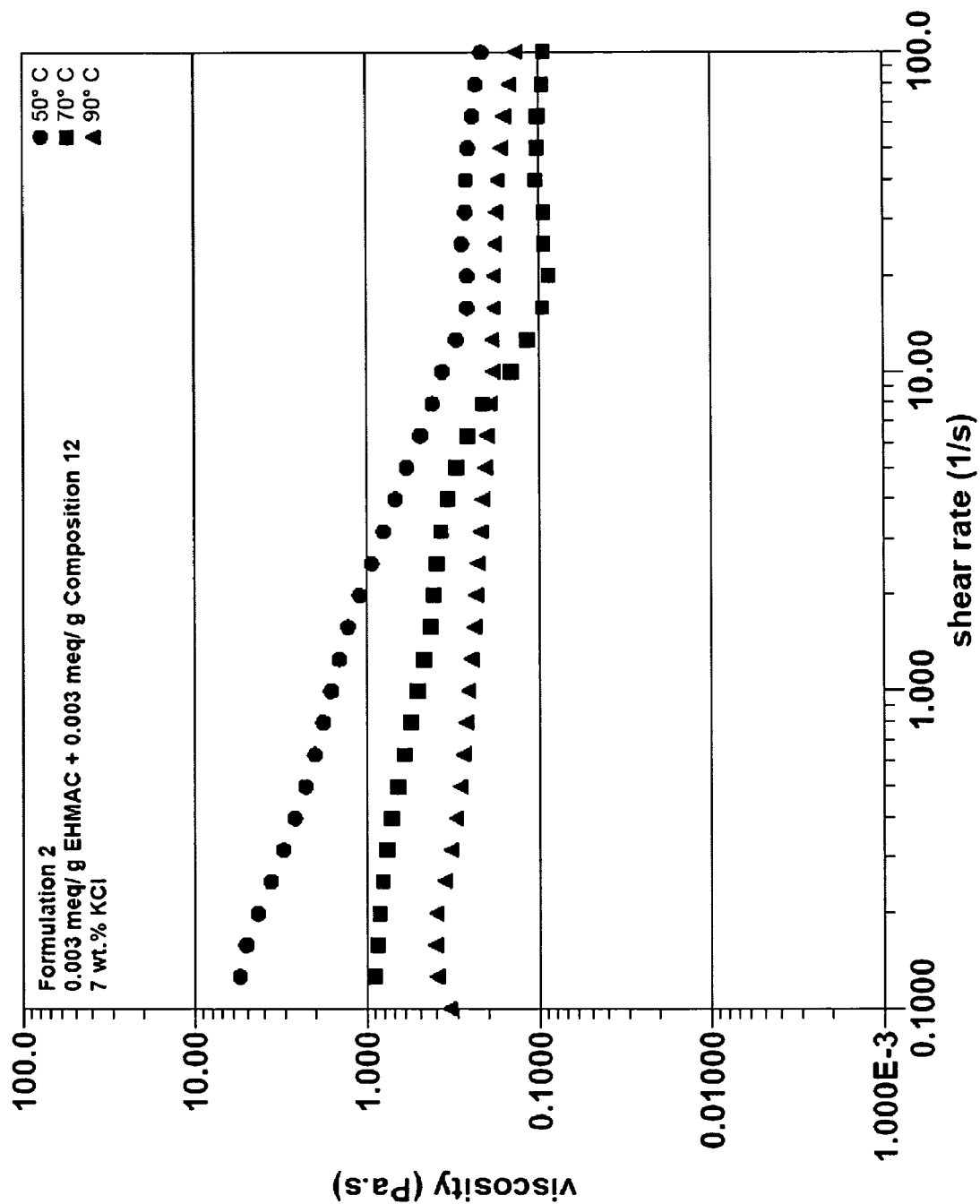
FIG. 17 shows graphs for stepped shear experiments for a CCE formulation (Formulation 2) made from the CCE composition of Example 12 and erucyl-N,N-di-(2-hydroxyethyl)-N-methylammonium chloride (EHMAC). The experiments were conducted at three temperatures—50° C., 70° C. and 90° C.

FIG. 17 demonstrates the benefit of a formulation (Formulation 2) using both a CCE of the present technology and an alkylamine quaternary ammonium compound of the prior art, erucyl-N,N-di-(2-hydroxyethyl)-N-methylammonium chloride (EHMAC). Formulation 2 was a solution prepared in 7% KCl to contain 0.003 meq/g of EHMAC and 0.003 meq/g of the CCE of Composition 12. Thus, as with the other solutions, the total concentration of quaternary ammonium compounds was 0.006 meq/g. The benefit of this formulation is substantial, since it reduces the requirement for the costly EHMAC by about 50 wt. %, yet still maintains viscosity at or above the threshold level. Also surprisingly, this formulation results in an anomalous viscosity temperature profile, and exhibits a higher viscosity at 90° C. than it does at 70° C.

Figure 18:
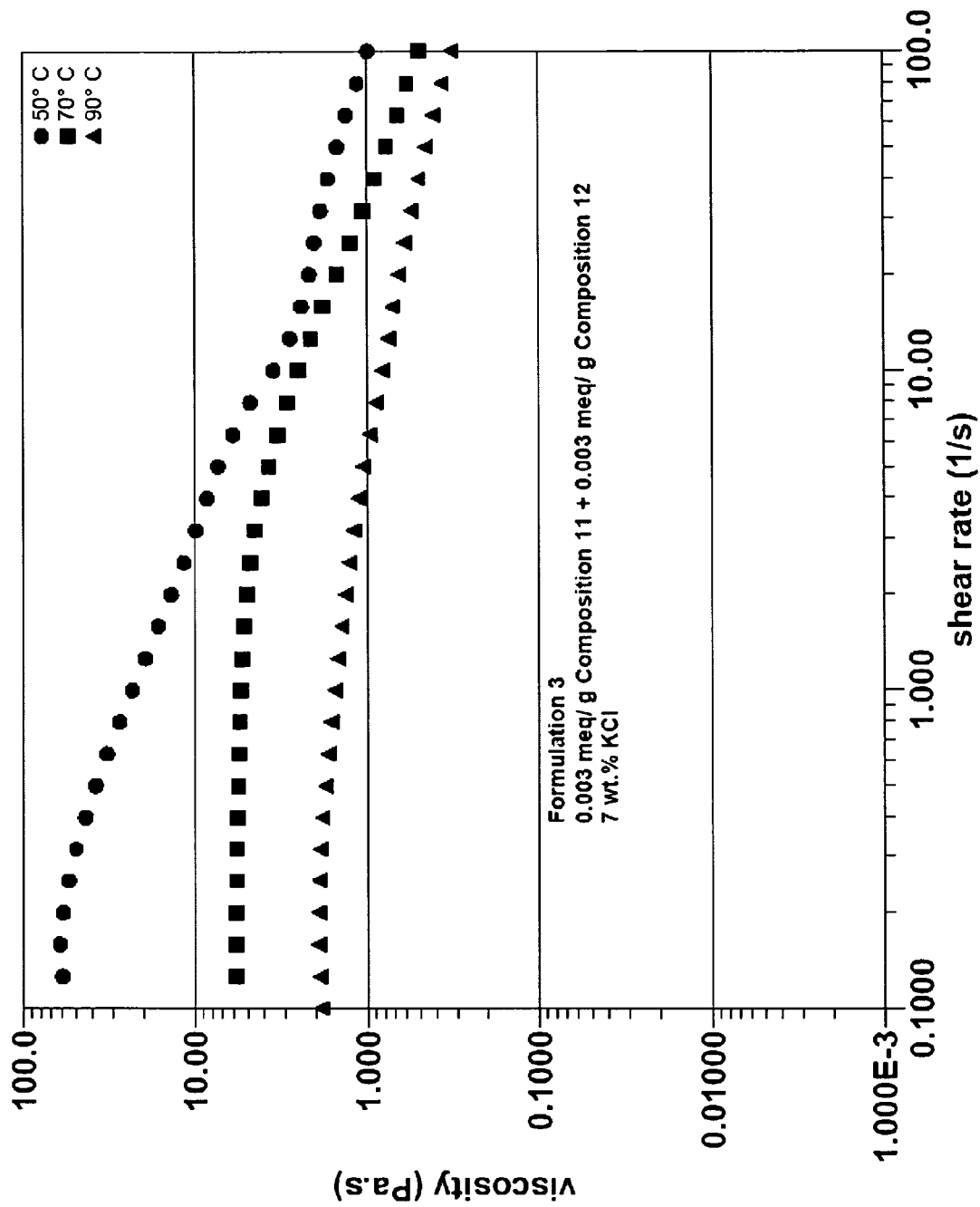
FIG. 18 shows graphs for stepped shear experiments for a CCE formulation (Formulation 3) made from the CCE compositions of Examples 11 and 12. The experiments were conducted at three temperatures—50° C., 70° C. and 90° C.

FIG. 18 demonstrates the benefit of a formulation (Formulation 3) using two different CCE compositions of the present technology. A solution was prepared in 7% KCl to contain 0.003 meq/g of the CCE of Composition 11 and 0.003 meq/g of the CCE of Composition 12. The margin by which the viscosity of this composition exceeds the threshold viscosity requirement of 0.1 Pa·s at 100 sec$^{-1}$ suggests that lower levels of quaternary ammonium compounds can be used to reach and exceed the threshold viscosity requirement of 0.1 Pa·s at 100 sec$^{-1}$ for a viscoelastic solution.

The invention has been described above in such a manner as to enable any person skilled in the art to which it pertains, to practice the same. It is to be understood that the foregoing describes preferred embodiments of the invention and that modifications may be made thereto without departing from the spirit or scope of the invention as set forth in the following claims.

What is claimed is:

1. A viscoelastic composition comprising water, not less than about 7% by weight, based on the total weight of the composition, of one or more inorganic salts and from about 0.5% to about 15% by weight, based on the total weight of the composition, of at least one cationic carbohydrate ether to control the viscoelasticity of the viscoelastic composition, wherein the at least one cationic carbohydrate ether comprises one or more cationic fragments and one or more carbohydrate fragments connected through an ether linkage to one or more linker fragments, wherein the ether linkage is between a non-glycosidic hydroxyl group on the one or more carbohydrate fragments and the one or more linker fragments, and wherein carbohydrate refers to a monosaccharide, oligosaccharide, or derivative thereof having a molecular weight equal to or less than 3000 Daltons, and wherein the carbohydrate or derivative thereof is not an alkyl glycoside; each linker fragment is a member selected from the group consisting of an oxygen atom that forms an ether link between two carbohydrate fragments, hydrocarbyl groups having from about 2 to about 30 carbon atoms, and substituted hydrocarbyl groups having from about 2 to about 30 carbon atoms; each cationic fragment comprises one or more quaternary ammonium groups; and the cationic carbohydrate ether comprises at least one hydrophobe, wherein the hydrophobe is chemically bonded to a substituent on the cationic fragment or the linker fragment through either an ester, carboxamide, or carboxamidine functional group.

2. The composition of claim 1, wherein each of the one or more carbohydrate fragments is derived from a member selected from the group consisting of sugars, reduced sugars, derivatives thereof, and combinations thereof.

3. The composition of claim 1, wherein each of the one or more carbohydrate fragments is derived from a compound selected from the group consisting of sucrose, glucose, fructose, lactose, maltose, glyceraldehyde, dihydroxyacetone, erythrose, ribose, ribulose, xylose, xylulose, galactose, mannose, sedoheptulose, neuraminic acid, dextrin, mannitol, sorbitol, glycerols, sucralose, gluconic acid, glucuronic acid, derivatives thereof, and mixtures thereof.

4. The composition of claim 1, wherein each of the one or more carbohydrate fragments comprises three or more hydroxyl groups, alkoxylated hydroxyl groups, alkylated hydroxyl groups, or a combination thereof.

5. The composition of claim 1, wherein the hydrophobe is derived from a carboxylic acid having from about 13 to about 40 carbon atoms.

6. The composition of claim 5, wherein the carboxylic acid has from about 16 to about 22 carbon atoms.

7. The composition of claim 6, wherein the carboxylic acid is derived from an animal or vegetable oil.

8. The composition of claim 1, wherein the linker fragment is hydrophilic.

9. The composition of claim 1, wherein the linker fragment comprises hydrocarbyl groups having from about 3 to about 8 carbon atoms or substituted hydrocarbyl groups having from about 3 to about 8 carbon atoms.

10. The composition of claim 9, wherein the linker fragment has a linear configuration.

11. The composition of claim 1, wherein the linker fragment comprises hydrocarbyl groups having from about 9 to about 21 carbon atoms or substituted hydrocarbyl groups having from about 9 to about 21 carbon atoms.

12. The composition of claim 11, wherein the linker fragment has a configuration comprising a ring.

13. The composition of claim 1, wherein the substituted hydrocarbyl groups for the linker fragment have one or more substituents selected from the group consisting of hydroxyl, alkoxy, aryloxy, amines, sulfonic acid, sulfonate, phosphinic acid, phosphinate, phosphorous acid, phosphite, phosphoric acid, phosphate, phosphonate, derivatives thereof, and combinations thereof.

14. The composition of claim 1, wherein the at least one cationic carbohydrate ether comprises two or more carbohydrate fragments, wherein at least two of the two or more carbohydrate fragments are connected with each other through a linker fragment via ether bonds between non-glycosidic hydroxyl groups on the two or more carbohydrate fragments and the linker fragment.

15. The composition of claim 1, wherein the at least one cationic carbohydrate ether is mono-cationic.

16. The composition of claim 1, wherein the at least one cationic carbohydrate ether is polycationic.

17. The composition of claim 1, wherein the linker fragment is derived from a carbohydrate derivative.

18. The composition of claim 17, wherein the linker fragment is derived from an epihalohydrin.

19. The composition of claim 1, wherein the total amount of all quaternary ammonium compounds in the composition is less than about 10% by weight based on the total weight of the composition.

20. The composition of claim 1, wherein the total amount of all quaternary ammonium compounds in the composition is from about 0.05% to about 4% by weight based on the total weight of the composition.

21. The composition of claim 1, further comprising at least one secondary cationic viscoelastic surfactant that is not a cationic carbohydrate ether.

22. The composition of claim 21, wherein the at least one cationic carbohydrate ether imparts an improved salt stability or acid solubility to the at least one secondary cationic viscoelastic surfactant.

23. The composition of claim 1, further comprising at least one additive selected from the group consisting of organic acids, salts of organic acids, poly acids, salts of poly acids, di-acids, salts of di-acids, anionic surfactants, anionic hydrotropes, derivatives thereof, and combinations thereof.

24. The composition of claim 1, wherein the inorganic salt is selected from the group consisting of sodium chloride, potassium chloride, ammonium chloride, calcium chloride, sodium bromide, calcium bromide, zinc bromide, potassium formate, cesium chloride, cesium bromide, and combinations thereof.

25. The composition of claim 1, comprising 20% or more by weight of one or more inorganic salts based on the total weight of the composition.

26. The composition of claim 1, being a clear viscoelastic gel or a clear thickened solution.

27. The composition of claim 1, further comprising a particulate material suspended therein.

28. The composition of claim 1, wherein the composition maintains viscoelasticity at a temperature greater than about 80° C.

29. The composition of claim 1, wherein the composition maintains viscoelasticity at a temperature greater than about 100° C.

30. The composition of claim 1, wherein the composition maintains viscoelasticity at a temperature greater than about 110° C.

31. The composition of claim 1, being a laundry additive, personal care formulation, an industrial and institutional cleaner, a scale remover and inhibitor, a corrosion inhibitor, a hydraulic fluid, a demulsifier, a foamer, an organoclay formulation, a thickener, a biocide formulation, or an oil field fluid.

32. A viscoelastic solution comprising not less than about 7% by weight, based on the total weight of the solution, of one or more inorganic salts, from about 0.5% to about 15% by weight, based on the total weight of the solution, of at least one cationic carbohydrate ether as a primary cationic viscoelastic surfactant and at least one secondary cationic viscoelastic surfactant that is not a cationic carbohydrate ether to control the viscoelasticity of the viscoelastic solution, wherein carbohydrate refers to a monosaccharide, oligosaccharide, or derivative thereof having a molecular weight equal to or less than 3000 Daltons, and wherein the carbohydrate or derivative thereof is not an alkyl glycoside; wherein the at least one cationic carbohydrate ether comprises one or more cationic fragments and one or more carbohydrate fragments connected through an ether linkage to one or more linker fragments, wherein the ether linkage is between a non-glycosidic hydroxyl group on the one or more carbohydrate fragments and the one or more linker fragments; each linker fragment is a member selected from the group consisting of an oxygen atom that forms an ether link between two carbohydrate fragments, hydrocarbyl groups having from about 2 to about 30 carbon atoms, and substituted hydrocarbyl groups having from about 2 to about 30 carbon atoms; each cationic fragment comprises one or more quaternary ammonium groups; and the cationic carbohydrate ether comprises at least one hydrophobe, wherein the hydrophobe is chemically bonded to a substituent on the cationic fragment or the linker fragment through either an ester, carboxamide, or carboxamidine functional group, wherein the at least one cationic carbohydrate ether imparts an improved salt stability to the secondary cationic viscoelastic surfactant.

33. The viscoelastic solution of claim 32, wherein the at least one cationic carbohydrate ether further imparts an improved acid solubility to the secondary cationic viscoelastic surfactant.

34. The viscoelastic solution of claim 32, being a clear viscoelastic solution.

35. The viscoelastic solution of claim 32, wherein the secondary cationic viscoelastic surfactant is a bis-quaternary ammonium compound, erucyl-N,N-di-(2-hydroxyethyl)-N-methylammonium chloride, or a combination thereof.

36. A viscoelastic wellbore treatment fluid for hydrocarbon recovery stimulation processes comprising water, not less than about 7% by weight, based on total weight of the wellbore treatment fluid, of one or more inorganic salts and from about 0.5% to about 15% by weight, based on the total weight of the wellbore treatment fluid, of at least one cationic carbohydrate ether to control the viscoelasticity of the viscoelastic wellbore treatment fluid and thereby permit hydrocarbon recovery stimulation, wherein carbohydrate refers to a monosaccharide, oligosaccharide, or derivative thereof having a molecular weight equal to or less than 3000 Daltons, and wherein the carbohydrate or derivative thereof is not an alkyl glycoside; the at least one cationic carbohydrate ether comprises one or more cationic fragments and one or more carbohydrate fragments connected through an ether linkage to one or more linker fragments, wherein the ether linkage is between a non-glycosidic hydroxyl group on the one or more carbohydrate fragments and the one or more linker fragments, wherein each linker fragment is a member selected from the group consisting of an oxygen atom that forms an ether link between two carbohydrate fragments, hydrocarbyl groups having from about 2 to about 30 carbon atoms, and substituted hydrocarbyl groups having from about 2 to about 30 carbon atoms; each cationic fragment comprises one or more quaternary ammonium groups; and the cationic carbohydrate ether comprises at least one hydrophobe, wherein the hydrophobe is chemically bonded to a substituent on the cationic fragment or the linker fragment through either an ester, carboxamide, or carboxamidine functional group.

37. The viscoelastic wellbore treatment fluid of claim 36, being a hydraulic fracturing fluid and further comprising a solid particulate material suspended therein.

38. The viscoelastic wellbore treatment fluid of claim 36, being a thickened acid solution for acidizing a wellbore and further comprising a sufficient amount of acid.

39. The viscoelastic wellbore treatment fluid of claim 38, wherein the at least one cationic carbohydrate ether serves to thicken the acid and prevent corrosion of steel pipes and tubing used in the wellbore.

40. The viscoelastic wellbore treatment fluid of claim 36, being a brine completion fluid and further comprising a sufficient amount of metal salts.

41. A method for treating a wellbore to improve hydrocarbon recovery, comprising applying the viscoelastic wellbore treatment fluid of claim 36 to the wellbore.

42. The method of claim 41, wherein the viscoelastic wellbore treatment fluid maintains viscoelasticity at a temperature greater than about 80° C.

43. The method of claim 41, wherein the viscoelastic wellbore treatment fluid maintains viscoelasticity at a temperature greater than about 100° C.

44. The method of claim 41, wherein the viscoelastic wellbore treatment fluid maintains viscoelasticity at a temperature greater than about 110° C.

45. The viscoelastic wellbore treatment fluid of claim 36, further comprising about 20% or more by weight of one or more inorganic salts based on the total weight of the wellbore treatment fluid.

* * * * *